United States Patent
Matsui et al.

(10) Patent No.: US 12,549,690 B2
(45) Date of Patent: Feb. 10, 2026

(54) VIDEO TRANSMISSION SYSTEM, VIDEO TRANSMISSION APPARATUS, VIDEO TRANSMISSION METHOD, AND RECORDING MEDIUM

(71) Applicant: NEC Corporation, Tokyo (JP)

(72) Inventors: Kazuki Matsui, Tokyo (JP); Soshi Iwaori, Tokyo (JP); Junki Kasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 18/717,491

(22) PCT Filed: Dec. 15, 2021

(86) PCT No.: PCT/JP2021/046315
§ 371 (c)(1),
(2) Date: Jun. 7, 2024

(87) PCT Pub. No.: WO2023/112217
PCT Pub. Date: Jun. 22, 2023

(65) Prior Publication Data
US 2025/0047817 A1 Feb. 6, 2025

(51) Int. Cl.
*H04N 7/18* (2006.01)
*G06V 20/40* (2022.01)
*G06V 20/52* (2022.01)

(52) U.S. Cl.
CPC ............ *H04N 7/183* (2013.01); *G06V 20/40* (2022.01); *G06V 20/52* (2022.01)

(58) Field of Classification Search
CPC ........ H04N 7/183; H04N 7/18; H04N 21/234; H04N 21/238; G06V 20/40; G06V 20/52; E02F 9/26

(Continued)

(56) References Cited

U.S. PATENT DOCUMENTS 10,949,685 B2 * 3/2021 Petrany .................... G06T 5/77
2018/0051446 A1 * 2/2018 Yoshinada .............. E02F 9/264
(Continued)

FOREIGN PATENT DOCUMENTS

JP H10-112861 A 4/1998
JP 2006-150550 A 6/2006
(Continued)

OTHER PUBLICATIONS

International Search Report for PCT Application No. PCT/JP2021/046315, mailed on Mar. 8, 2022.

*Primary Examiner* — John W Miller
*Assistant Examiner* — Omer Khalid

(57) ABSTRACT

In order to stably transmit a video of a surrounding area of a work machine even under an environment of a variable communication quality while maintaining operability during remote operation of the work machine, a video transmission system (1) includes: an acquiring section (11) for acquiring a video captured with at least a portion of a work machine and at least a portion of a work area of the work machine being within an angle of view; a status identifying section (12) for identifying a status of work performed, by the work machine, on an object being worked; a region identifying section (13) for identifying a target region in the video according to a result of identification carried out by the status identifying means; and a transmitting section (14) for transmitting a post-adjustment video obtained by adjusting a relative image quality between the target region and a region outside the target region in the video.

20 Claims, 18 Drawing Sheets

(58) Field of Classification Search
USPC .......................................................... 348/143
See application file for complete search history.

(56) References Cited

U.S. PATENT DOCUMENTS

| | | | | |
|---|---|---|---|---|
| 2018/0174377 A1* | 6/2018 | Collins | ................... | E02F 9/261 |
| 2018/0352162 A1* | 12/2018 | Oblak | ................... | G06V 10/235 |
| 2021/0071394 A1* | 3/2021 | Kean | ......................... | B60R 1/26 |

FOREIGN PATENT DOCUMENTS

| | | | | |
|---|---|---|---|---|
| JP | 2010-262477 A | | 11/2010 | |
| JP | 2012028949 A | * | 2/2012 | |
| JP | 2018-121195 A | | 8/2018 | |
| JP | 2020-022065 A | | 2/2020 | |
| JP | 2020-077173 A | | 5/2020 | |
| JP | 2020-161933 A | | 10/2020 | |
| JP | 2020-200660 A | | 12/2020 | |
| JP | 2021-179759 A | | 11/2021 | |
| WO | WO-2016031009 A1 | * | 3/2016 | ......... H04N 23/6811 |
| WO | 2020/065838 A1 | | 4/2020 | |
| WO | WO-2020095830 A1 | * | 5/2020 | ............. H04N 23/90 |
| WO | WO-2021230093 A1 | * | 11/2021 | ............... G06T 9/00 |

\* cited by examiner

VIDEO TRANSMISSION SYSTEM, VIDEO TRANSMISSION APPARATUS, VIDEO TRANSMISSION METHOD, AND RECORDING MEDIUM

This application is a National Stage Entry of PCT/JP2021/046315 filed on Dec. 15, 2021, the contents of all of which are incorporated herein by reference, in their entirety.

TECHNICAL FIELD

The present invention relates to a technique for transmitting a video.

BACKGROUND ART

Patent Literature 1 discloses a remote operation apparatus for displaying, on a display at a remote location, a video of work performed by a construction machine. The remote operation apparatus acquires the position of the line of sight of an operator performing an operation at a remote location, and generates an enlarged video obtained by enlarging a portion of the video of work, the portion being related to the line of sight, to display the enlarged video on the display.

Patent Literature 2 discloses a remote operation communication system for not only capturing, on a first camera, the entire surrounding region of a construction machine but also capturing, on a second camera, a specific region located in the central part of the surrounding region. The remote operation communication system compresses image data captured by the first camera with a high compression ratio and compresses image data captured by the second camera with a low compression ratio, and transmits these pieces of image data to a remote location where an operator is present. In the remote location, these pieces of image data are decompressed to be displayed, so that the specific region is displayed with a higher image quality than the surrounding region is.

CITATION LIST

Patent Literature

[Patent Literature 1]
Japanese Patent Application Publication Tokukai No. 2020-077173
[Patent Literature 2]
Japanese Patent Application Publication Tokukaihei No. 10-112861

SUMMARY OF INVENTION

Technical Problem

With the remote operation apparatus disclosed in Patent Literature 1, there is a possibility of occurrence of disruption, disconnection, etc. of a video of work under an environment of a variable communication quality. Further, with the remote operation system disclosed in Patent Literature 2, there is a possibility that a region of interest in performing remote control is not contained in the specific region, and in such a case, the operability during the remote control deteriorates.

An example aspect of the present invention has been made in view of the above problems, and an example object thereof is to provide a technique for stably transmitting a video of a surrounding area of a work machine even under an environment of a variable communication quality while maintaining operability during remote operation of the work machine.

Solution to Problem

A video transmission system in accordance with an example aspect of the present invention includes at least one processor, and the at least one processor carries out: an acquiring process of acquiring a video captured with at least a portion of a work machine and at least a portion of a work area of the work machine being within an angle of view; a status identifying process of identifying a status of work performed, by the work machine, on an object being worked; a region identifying process of identifying a target region in the video according to a result of identification carried out in the status identifying process; and a transmitting process of transmitting a post-adjustment video obtained by adjusting a relative image quality between the target region and a region outside the target region in the video.

A video transmission apparatus in accordance with an example aspect of the present invention includes at least one processor, and the at least one processor carries out: an acquiring process of acquiring a video captured with at least a portion of a work machine and at least a portion of a work area of the work machine being within an angle of view; a status identifying process of identifying a status of work performed, by the work machine, on an object being worked; a region identifying process of identifying a target region in the video according to a result of identification carried out in the status identifying process; and a transmitting process of transmitting a post-adjustment video obtained by adjusting a relative image quality between the target region and a region outside the target region in the video.

A video transmission method in accordance with an example aspect of the present invention includes: at least one processor acquiring a video captured with at least a portion of a work machine and at least a portion of a work area of the work machine being within an angle of view; the at least one processor identifying a status of work performed, by the work machine, on an object being worked; the at least one processor identifying a target region in the video according to a result of identification of the status of work; and the at least one processor transmitting a post-adjustment video obtained by adjusting a relative image quality between the target region and a region outside the target region in the video.

Advantageous Effects of Invention

According to an example aspect of the present invention, it is possible to stably transmit a video of a surrounding area of a work machine even under an environment of a variable communication quality while maintaining operability during remote operation of the work machine.

EXAMPLE EMBODIMENTS

First Example Embodiment

Figure 1:
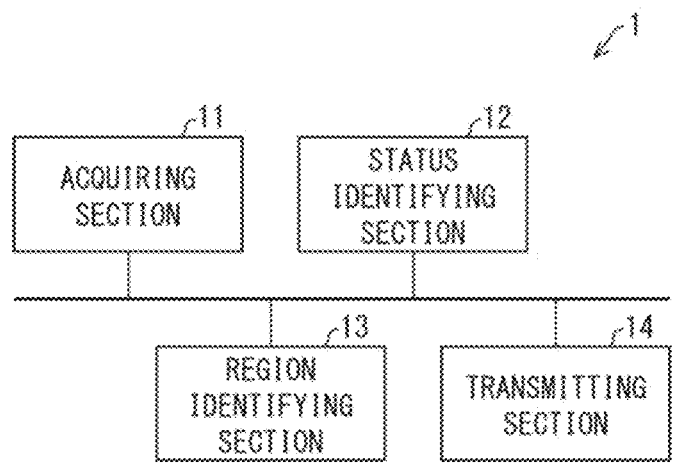
FIG. 1 is a block diagram illustrating a configuration of a video transmission system in accordance with a first example embodiment of the present invention.

The following description will discuss a first example embodiment of the present invention in detail, with reference to the drawings. The present example embodiment is basic to example embodiments which will be described later.
<Configuration of Video Transmission System 1>
Here is a description of a configuration of a video transmission system 1 in accordance with the present example embodiment, discussed with reference to FIG. 1. FIG. 1 is a block diagram illustrating a configuration of the video transmission system 1.

The video transmission system 1 includes an acquiring section 11, a status identifying section 12, a region identifying section 13, and a transmitting section 14, as illustrated in FIG. 1. The acquiring section 11 is an example component for implementing the acquiring means recited in the claims. The status identifying section 12 is an example component for implementing the status identifying means recited in the claims. The region identifying section 13 is an example component for implementing the region identifying means recited in the claims. The transmitting section 14 is an example component for implementing the transmitting means recited in the claims.

Figure 2:
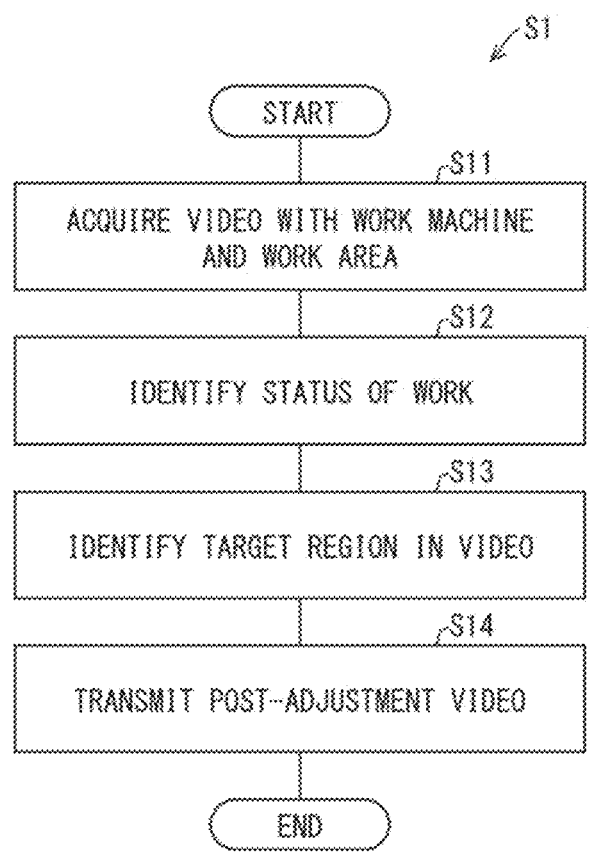
FIG. 2 is a flowchart illustrating a flow of a video transmission method in accordance with the first example embodiment of the present invention.

The acquiring section 11 acquires a video captured with at least a portion of a work machine and at least a portion of a work area of the work machine being within an angle of view. The status identifying section 12 identifies the status of work performed, by the work machine, on an object being worked. The region identifying section 13 identifies a target region in the video according to a result of identification carried out by the status identifying section 12. The transmitting section 14 transmits a post-adjustment video obtained by adjusting a relative image quality between the target region and a region outside the target region in the video. The status of work, target region, and post-adjustment video will be described in detail in the section "Flow of video transmission method S1" below.
<Flow of Video Transmission Method S1>
Here is a description of a flow of a video transmission method S1 carried out by the video transmission system 1 configured as described above, discussed with reference to FIG. 2. FIG. 2 is a flowchart for explaining a flow of the video transmission method S1. The video transmission method S1 includes steps S11 to S14, as illustrated in FIG. 2.

(Step S11)

In step S11, the acquiring section 11 acquires a video captured with at least a portion of a work machine and at least a portion of a work area of the work machine being within an angle of view. Specifically, the acquiring section 11 acquires, from an image capturing apparatus, the video captured by the image capturing apparatus. The image capturing apparatus may be installed in the work machine, or may be installed in a surrounding area of the work machine. The work area is an area where the work machine performs work. The work area may be, for example, an area in which the work machine can be in operation, an area in which the work machine can move, an area in which an object being worked can be present, or an area which is a combination of some or all of the foregoing areas. The surrounding area of the work machine may be any location, provided that the location enables a view of the work area from a higher position. For example, the surrounding area of the work machine may be a ceiling or pillar of the work area, or a beam of the work area, for indoor instances. Further, the surrounding area of the work machine may be a post built in the work area or an eave or wall of a building, for outdoor instances. However, the surrounding area of the work machine is not limited thereto.

(Step S12)

In step S12, the status identifying section 12 identifies the status of work, performed by the work machine, on the object being worked. Examples of the status of work include the type of work. In addition, examples of the status of work include the status of a working portion of the work machine. In this case, examples of the status of the working portion include at least one selected from the group consisting of the position of the working portion, the motion of the working portion, and the presence or absence of the object being worked in the working portion. Examples of the motion of the working portion include, but are not limited to, a sequence of target points (as a specific example, a set of points through which the working portion passes during motion, or the track of motion), an acceleration, or the direction of change in velocity. Further, examples of the status of work include the status of another work machine located in the surrounding area of the work machine. Furthermore, examples of the status of work include the status of the object being worked, a positional relationship between the work machine and the other work machine, and the surrounding environment of the work machine. Examples of a specific example of the surrounding environment include the extent of a region of a ground surface showing up in a video. By referring to the extent of such a region, it is possible to determine, in a case where the work machine is a backhoe, whether the status of work of the work machine is excavation which is in progress. However, the status of work is not limited thereto.

Specifically, for example, the status identifying section 12 may identify the status of work with reference to at least the result of analyzing the video acquired in step S11. As another example, the status identifying section 12 may identify the status of work with reference to at least information which indicates the phase of work performed by the work machine. Examples of the information which indicates the phase of work include information (as an example, operation commands) on control over work machine, the information being based on the operation of an operator.
(Step S13)

In step S13, the region identifying section 13 identifies a target region in the video according to the result of identification carried out by the status identifying section 12. The target region is a partial region of a video. In addition, the target region is a region subjected to adjustment of relative image quality between the target region and a region other than the partial region in the video. For example, in a case where the status of work contained in the result of identification is a first status, the region identifying section 13 identifies, as the target region, the region of the video that contains a first working portion. Further, in a case where the status of work contained in the result of identification is a second status, the region identifying section 13 identifies, as the target region, the region of the video that contains a second working portion. The first status and the second status differ from each other at least in part, and the first working portion and the second working portion differ from each other at least in part. For example, in a case where the work machine is a backhoe, a region which contains the first working portion "bucket" is identified as the target region, with respect to the first status "excavation in progress". As another example, a region which contains the second working portion "boom, arm, and bucket" is identified as the target region, with respect to the second status "swing in progress".

The region of interest during remote operation changes with a change in the status of work performed by the work machine. For example, in a case where the work machine swings clockwise, the right-hand region, which is in the direction of the swing, is considered to be of interest, whereas in a case where the work machine swings counterclockwise, the left-hand region is considered to be of interest. For example, the remote operation system disclosed in Patent Literature 2 is incapable of dealing with such changes in the region of interest. In contrast, according to the present example embodiment, the target region is identified in this step, according to the status of work, and it is therefore possible to deal with such changes in the region of interest.
(Step S14)

In step S14, the transmitting section 14 transmits a post-adjustment video obtained by adjusting a relative image quality between the target region and a region outside the target region in the video acquired in step S11. For example, the post-adjustment video is an image obtained by encoding the video acquired in step S11 such that the image quality of the region outside the target region is lower than that of the target region. Examples of the image quality include, but are not limited to, a bit rate, the number of pixels, and a combination thereof. A process of generating the post-adjustment video may be carried out by an apparatus included in the video transmission system 1, or may be carried out an external apparatus which is not included in the video transmission system 1.

The functional blocks included in the present example embodiment are not limited to being integrated into one apparatus, but may be distributed among a plurality of apparatuses. Further, the functional blocks of each of the example embodiments may be disposed in the cloud. These functional blocks may be disposed in any apparatus(es) or cloud, provided that the above-described function of each of the functional blocks can be implemented by as-needed transmission and reception of information between these functional blocks.

Example Advantage of Present Example Embodiment

A configuration adopted in the present example embodiment is as follows: (i) a video is acquired, the video being captured with at least a portion of a work machine and at least a portion of a work area being within an angle of view, (ii) the status of work performed, by the work machine, on an object being worked is identified, (iii) according to the result of the identification, a target region is identified in the video acquired, and (iv) a post-adjustment video is transmitted, the post-adjustment video being obtained by adjusting a relative image quality between the target region and a target region in the video.

With this configuration, by transmitting the post-adjustment video, it is possible to reduce communication traffic, compared with the case of transmitting the video as acquired. This makes it possible to stably transmit the post-adjustment video even in a case of a deteriorated quality of communication with a receiver. It is also possible to change such a target region, according to the status of work. As a result, it is possible for the receiver to perform remote operation of the work machine while visually checking, with the adjusted image quality, the target region identified according to the status of work. It is therefore possible to stably transmit a video of a surrounding area of the work machine even under an environment of a variable communication quality while maintaining operability during remote operation of the work machine.

First Additional Example Aspect of Present Example Embodiment

Figure 3:
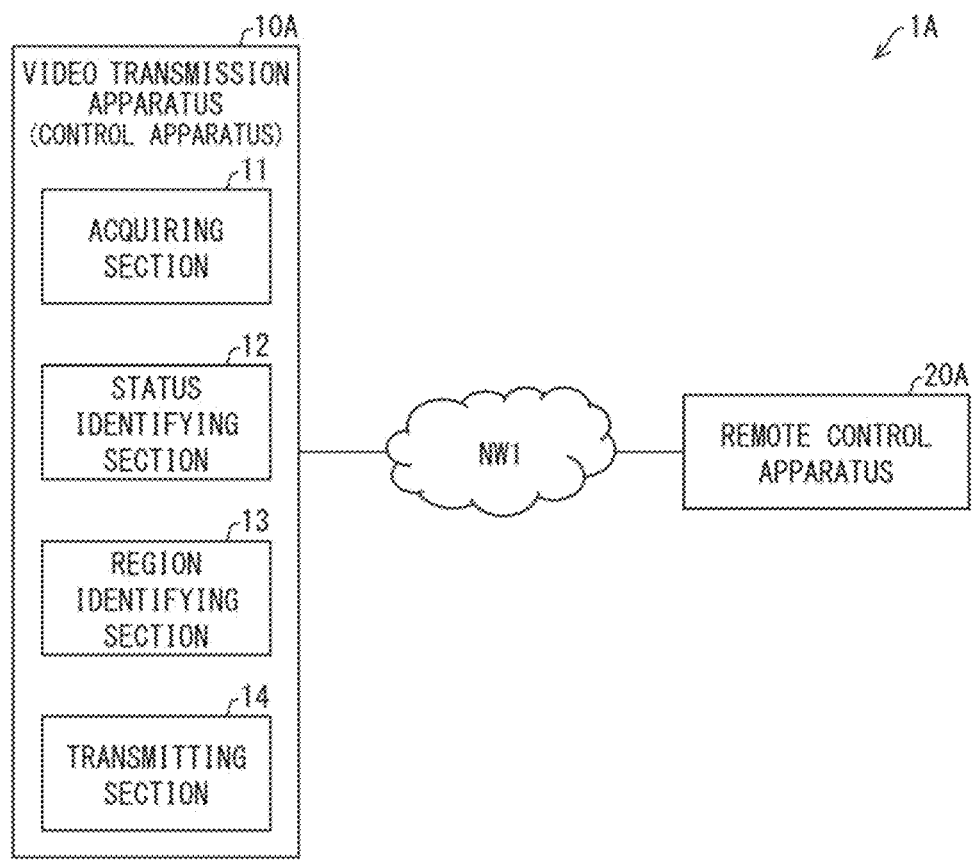
FIG. 3 is a block diagram illustrating an additional example aspect of the video transmission system in accordance with the first example embodiment of the present invention.

Here is a description of a video transmission system 1A in accordance with a first additional example aspect of the present example embodiment, discussed with reference to FIG. 3. FIG. 3 is a block diagram illustrating a configuration of the video transmission system 1A in accordance with the first additional example aspect. The video transmission system 1A includes a video transmission apparatus 10A and a remote control apparatus 20A, as illustrated in FIG. 3. The video transmission apparatus 10A and the remote control apparatus 20A are communicably connected together over a network NW1. Examples of the network NW1 include a wireless local area network (LAN), a wide area network (WAN), a mobile data communication network (such as 3G, Long Term Evolution (LTE), 4G, 5G, or local 5G), and a combination thereof. However, the network NW1 is not limited thereto.

The video transmission apparatus 10A includes the acquiring section 11, the status identifying section 12, the region identifying section 13, and the transmitting section 14. The details of each of these sections are as described above. The video transmission apparatus 10A carries out the video transmission method S1. The details of the video transmission method S1 are as described above. To the receiver of the post-adjustment video in step S14, the remote control apparatus 20A is applied.

The remote control apparatus 20A decodes the post-adjustment video transmitted by the video transmission apparatus 10A, and displays the post-adjustment video on a display (not illustrated). In addition, the remote control apparatus 20A transmits, to the video transmission apparatus 10A, a remote control signal which corresponds to operation information inputted by an operator. The video transmission apparatus 10A also functions as a control apparatus for controlling the motion of the work machine.

With the above configuration, the video transmission system 1A produces the same example advantage that is described above.

Second Additional Example Aspect of Present Example Embodiment

Figure 4:
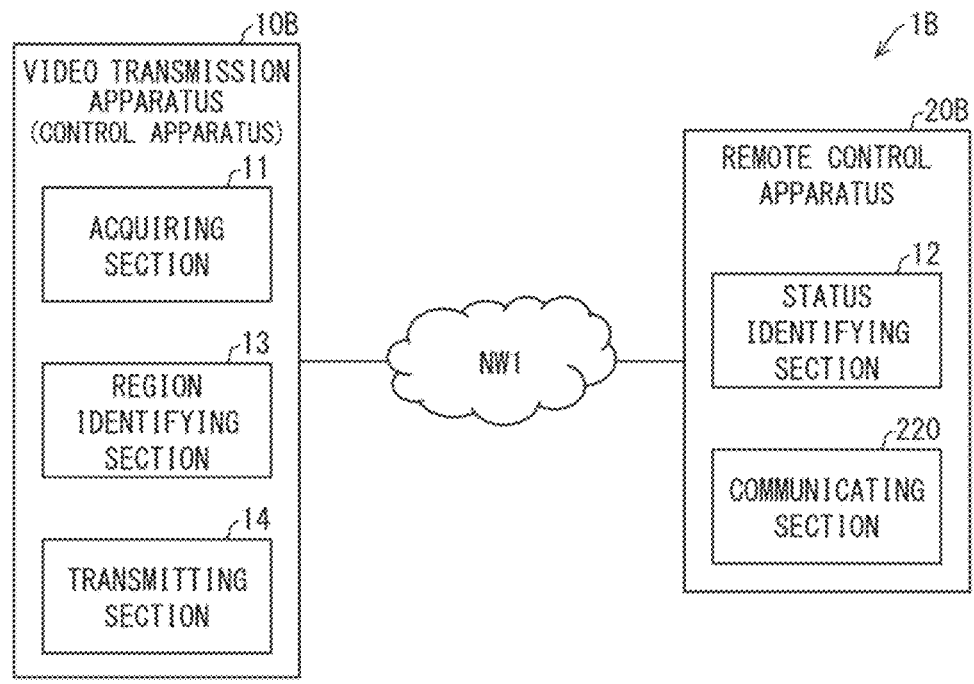
FIG. 4 is a block diagram illustrating a further additional example aspect of the video transmission system in accordance with the first example embodiment of the present invention.

Here is a description of a video transmission system 1B in accordance with a second additional example aspect of the present example embodiment, discussed with reference to FIG. 4. FIG. 4 is a block diagram illustrating a configuration of the video transmission system 1B in accordance with the second additional example aspect. The video transmission system 1B includes a video transmission apparatus 10B and a remote control apparatus 20B, as illustrated in FIG. 4. The video transmission apparatus 10B and the remote control apparatus 20B are communicably connected together over the network NW1. Specific examples of the network NW1 are as described above.

The video transmission apparatus 10B includes the acquiring section 11, the region identifying section 13, and the transmitting section 14. The remote control apparatus 20B includes the status identifying section 12 and a communicating section 220. The details of the acquiring section 11, the status identifying section 12, the region identifying section 13, and the transmitting section 14 are as described above. The communicating section 220 transmits and receives information to and from the video transmission apparatus 10B.

The video transmission apparatus 10B and the remote control apparatus 20B carries out the video transmission method S1. Although the details of the video transmission method S1 are generally as described above, there are the following differences in step S11 and step S12.

In step S11, the acquiring section 11 of the video transmission apparatus 10B transmits, to the remote control apparatus 20B, a video acquired. In step S12, the status identifying section 12 of the remote control apparatus 20B identifies the status of work on the basis of the video acquired, and transmits, to the video transmission apparatus 10B, the status of work identified.

In a case of a deteriorated communication quality at the time when the video transmission apparatus 10B transmits the video to the remote control apparatus 20B in step S11, there is a possibility that the video decoded by the remote control apparatus 20B has a deteriorated image quality. However, even though not sufficient from the viewpoint of the presentation to the operator for operation, the image quality of the video can be sufficient for the process of identifying the status of work. It is therefore possible for the status identifying section 12 disposed in the remote control apparatus 20B to identify the status of work in step S12.

Note that in step S12, it is possible for the status identifying section 12 of the remote control apparatus 20B to identify the status of work with reference to the post-adjustment video transmitted in step S14 of the video transmission method S1 carried out the last time. This makes it possible for the status identifying section 12 to more accurately identify the status of work than in the case where the communication quality deteriorates and the video of a low image quality transmitted in step S11 is then referred to. As a result, it is possible for the region identifying section 13 of the video transmission apparatus 10B to more accurately identify the target region. In other words, the accuracy of identification of the target region improves as the number of repetitions of the video transmission method S1 increases. This makes it possible for the operator to gradually understand the region of interest to a sufficient degree even in a case where a video of a low image quality is initially displayed due to a deteriorated communication quality.

With the above configuration, it is possible for the video transmission system 1B to not only produce the same example advantage that is described above but also reduce the processing load placed on the video transmission apparatus 10B disposed on the work machine-side.

Third Additional Example Aspect of Present Example Embodiment

Figure 5:
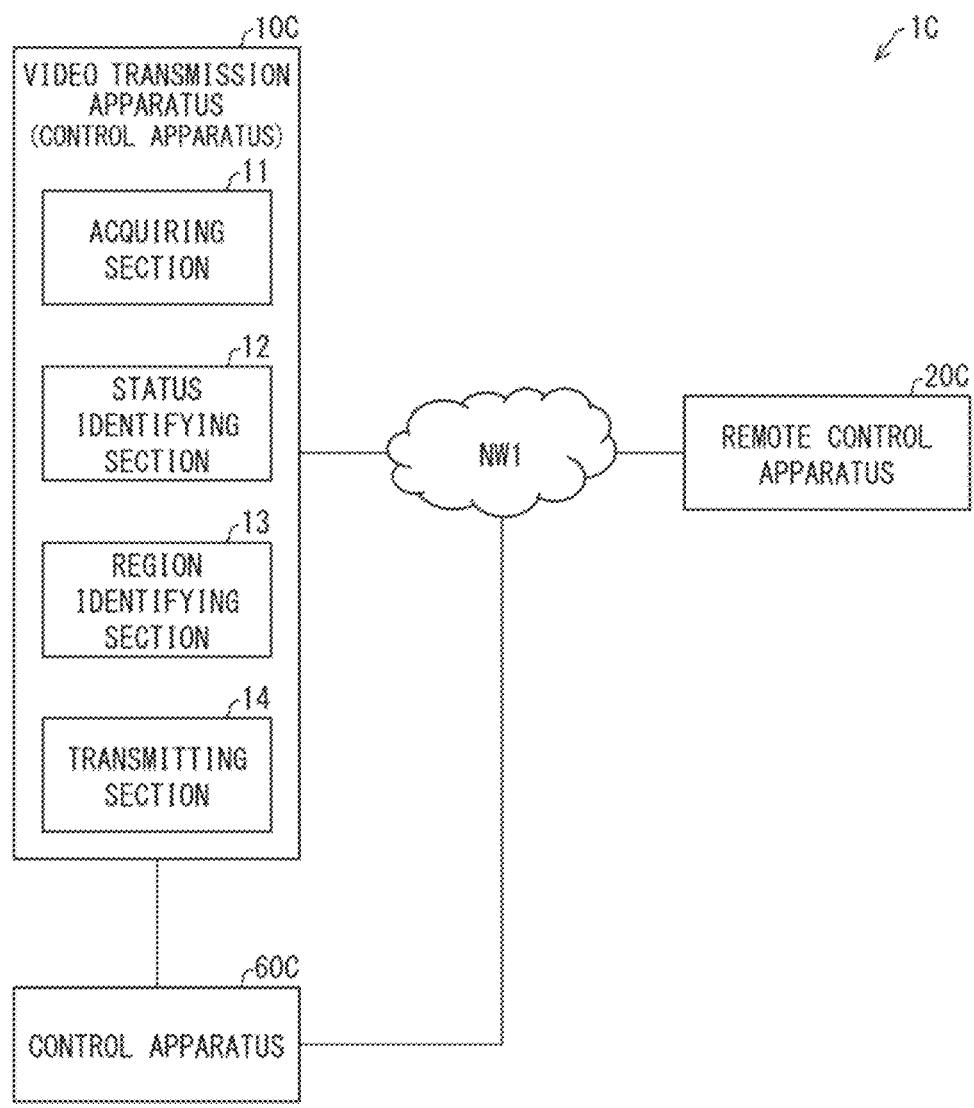
FIG. 5 is a block diagram illustrating a still further additional example aspect of the video transmission system in accordance with the first example embodiment of the present invention.

Here is a description of a video transmission system 1C in accordance with a third additional example aspect of the present example embodiment, discussed with reference to FIG. 5. FIG. 5 is a block diagram illustrating a configuration of the video transmission system 1C in accordance with the third additional example aspect. The video transmission system 1C includes a video transmission apparatus 10C, a remote control apparatus 20C, and a control apparatus 60C, as illustrated in FIG. 5. The remote control apparatus 20C is communicably connected to the video transmission apparatus 10C and to the control apparatus 60C, over the network NW1.

The control apparatus 60C is an apparatus for controlling the motion of the work machine, and is, for example, incorporated in the work machine. The control apparatus 60C is an apparatus for inputting a motion control signal for putting the parts of the work machine in motion. Described as an example is a case where the work machine operates by autonomous control (the case of a work machine which is not intended to be operated by an operator on the work machine or which is intended and designed to receive a motion control signal from without the work machine to operate). In this case, the control apparatus 60C inputs, to each part of the work machine, a motion control signal which corresponds to the remote control signal from the remote control apparatus 20C. Described as another example is a case where the work machine includes an operation section (not illustrated), and operates through operation of the operation section that have an attachment attached thereto. In this case, the control apparatus 60C is communicably connected to the attachment (not illustrated). The attachment is an apparatus for operating the operation section according to the remote control signal from the remote control apparatus 20C. For example, in a case where the operation section is a rod-shaped operation lever having an end fixed as a fulcrum, the attachment controls the tilt direction and tilt angle of the operation lever according to the remote control signal from the remote control apparatus 20C. In addition, the control apparatus 60C inputs the motion control signal to each part on the basis of the motion of the operation section operated by the attachment.

The video transmission apparatus 10C is configured approximately the same as the video transmission apparatus 10A of the first example aspect. However, unlike the case with the first example aspect, the video transmission apparatus 10C and the control apparatus 60C are configured as separate apparatuses. The video transmission apparatus 10C may be incorporated in the work machine, or may be disposed in the surrounding area of the work machine. The remote control apparatus 20C is configured approximately the same as the remote control apparatus 20A of the first example aspect. However, unlike the case with the first example aspect, the remote control apparatus 20C transmits, to the control apparatus 60C, a remote control signal which corresponds to operation information inputted by an operator.

The video transmission apparatus 10C and the remote control apparatus 20C carry out the video transmission method S1. The details of the video transmission method S1 are as described in the first example aspect.

Furthermore, the remote control apparatus 20C decodes the post-adjustment video transmitted in step S14, and displays the post-adjustment video on a display (not illustrated), and also transmits, to the control apparatus 60C, a remote control signal which corresponds to operation information inputted by an operator.

With the above configuration, it is possible for the video transmission system 1C to not only produce the same example advantage as in the first example aspect but also reduce the load placed on the control apparatus for controlling the motion of the work machine.

Still Further Additional Example Aspect of Present Example Embodiment

The present example embodiment is not limited to the example aspects described above, but the status identifying section 12, the region identifying section 13, or both may be disposed in the video transmission apparatus 10, or may be disposed in the remote control apparatus 20.

Second Example Embodiment

The following description will discuss a second example embodiment of the present invention in detail, with reference to the drawings. A component that has the same function as a component described in the first example embodiment is assigned the same reference sign, and the description thereof is omitted where appropriate.
<Configuration of Video Transmission System 1D>

Figure 6:
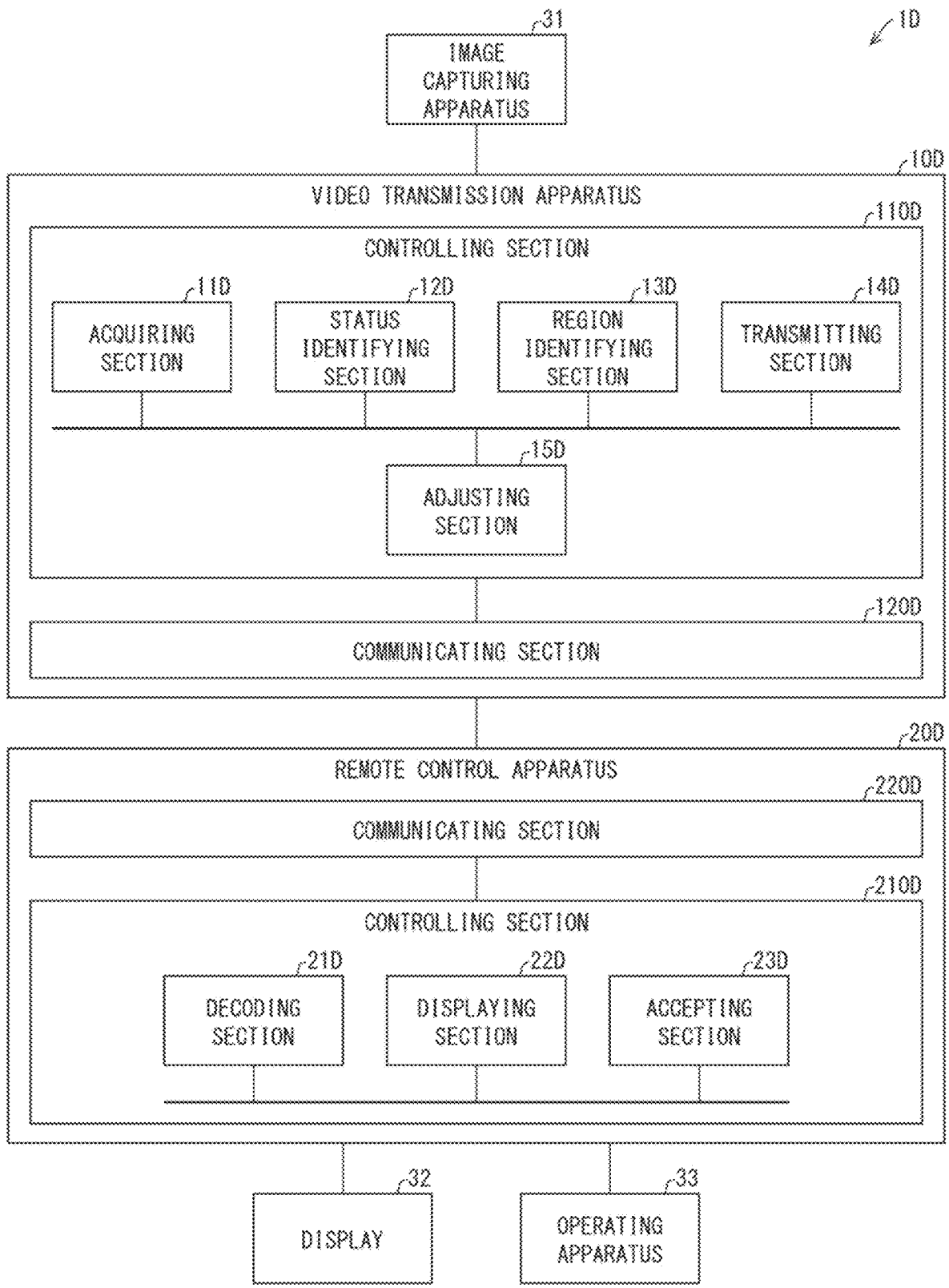
FIG. 6 is a block diagram illustrating a configuration of the video transmission system in accordance with a second example embodiment of the present invention.
Figure 7:
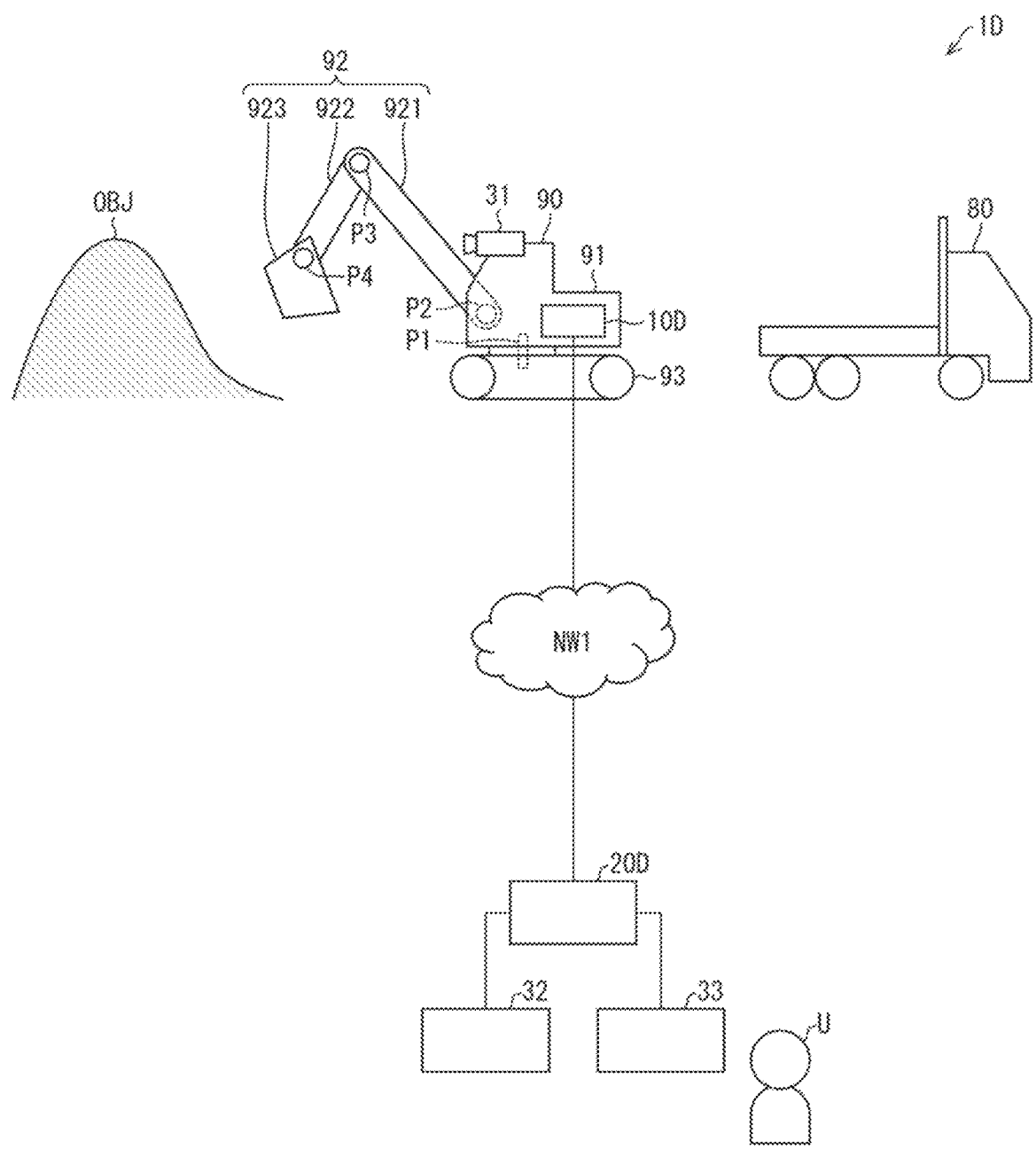
FIG. 7 is a schematic view illustrating an example arrangement of the apparatuses of the video transmission system illustrated in FIG. 5.

Here is a description of a configuration of a video transmission system 1D in accordance with the present example embodiment, discussed with reference to FIGS. 6 and 7. FIG. 6 is a block diagram illustrating a configuration of the video transmission system 1D. FIG. 7 is a schematic view illustrating an example arrangement of the apparatuses of the video transmission system 1D.

The video transmission system 1D includes a video transmission apparatus 10D, a remote control apparatus 20D, an image capturing apparatus 31, a display 32, and an operating apparatus 33, as illustrated in FIG. 6. The operating apparatus 33 is an apparatus for remote control of a backhoe 90. For example, in a case where the backhoe 90 operates by autonomous control (the case of a work machine which is not intended to be operated by an operator on the work machine or which is intended and designed to receive a motion control signal from without the work machine to operate), the operating apparatus 33 is an apparatus for remotely operating the autonomous control of the backhoe 90. As another example, in a case where the backhoe 90 includes an operation section (not illustrated) and operates through operation of the operation section that have an attachment attached thereto, the operating apparatus 33 is an apparatus for remotely controlling the operation section. The details of the backhoe 90 will be described later. The video transmission apparatus 10D is connected to the image capturing apparatus 31. The remote control apparatus 20D is connected to the display 32 and to the operating apparatus 33. Further, the video transmission apparatus 10D and the remote control apparatus 20D are communicably connected together over a network NW1.

In the example illustrated in FIG. 7, the video transmission apparatus 10D is incorporated in the backhoe 90. In this example, the video transmission apparatus 10D is provided with use of the same computer as is the control apparatus for controlling the motion of the backhoe 90. The remote control apparatus 20D is an apparatus for an operator U to remotely control the backhoe 90. The remote control apparatus 20D is installed at a place different from the work area of the backhoe 90.

(Backhoe 90)

Here is a description of a specific configuration of the backhoe 90. The backhoe 90 performs work of excavating dirt and sand OBJ and loading the dirt and sand OBJ onto a dump truck 80. The backhoe 90 is an example of the "work machine" recited in the claims. The dirt and sand OBJ is an example of the "object being worked" recited in the claims. The dump truck 80 is an example of "another work machine" recited in the claims. The backhoe 90 operates under control of the remote control apparatus 20D. The backhoe 90 includes a swinging section 91, a movable section 92, and a traveling section 93, as illustrated in FIG. 7.

The traveling section 93 travels so as to cause the backhoe 90 to move forward, move backward, turn left, and turn right. The traveling section 93 uses, for example, caterpillar belts to travel.

The swinging section 91 is attached to the traveling section 93. The swinging section 91 is capable of swinging about a swing shaft P1 in a plane perpendicular to the sheet of FIG. 7. It should be noted that in a case where the backhoe 90 is on level ground, the plane perpendicular to the sheet of FIG. 4 is the horizontal plane; therefore, this plane is referred to as a "horizontal plane" for convenience.

The movable section 92 includes a boom 921 attached to the swinging section 91, an arm 922 attached to an end of the boom 921, and a bucket 923 attached to an end of the arm 922. The boom 921 is capable of to-and-fro swing about a boom shaft P2, in a plane substantially perpendicular to the horizontal plane. The arm 922 is capable of to-and-fro swing about an arm shaft P3A, in the same swing plane in which the boom 921 swings. The bucket 923 is capable of to-and-fro swing about a bucket shaft P4, in the same swing plane in which the arm 922 swings. The movable section 92 is an example of "another working portion" recited in the claims.

(Image Capturing Apparatus 31)

In the example illustrated in FIG. 7, the image capturing apparatus 31 is incorporated in the backhoe 90. The image capturing apparatus 31 is installed so as to have an angle of view within which lie (i) at least a portion of the following: the movable section 92 (boom 921, arm 922, and bucket 923); and the swinging section 91, and (ii) at least a portion of a work area including the dirt and sand OBJ. With this installation, the image capturing apparatus 31 generates a video in which the above (i) and (ii) are contained as the subjects. A video generated by the image capturing apparatus 31 is a moving image. In other words, the video includes a temporal series of a plurality of still images. The image capturing apparatus 31 may have an image capturing direction which is fixed or which is variable. In that case, for example, the image capturing direction of the image capturing apparatus 31 can be changed with use of a remote control signal from the remote control apparatus 20D. In this case, it is desirable that the image capturing direction of the image capturing apparatus 31 be changed in such a range that at least the movable section 92, the swinging section 91, and the dirt and sand OBJ are within the angle of view. Further, although a single image capturing apparatus 31 is illustrated in FIG. 7, the video transmission apparatus 10D may acquire a video from each of a plurality of image capturing apparatuses 31.

(Video Transmission Apparatus 10D)

The video transmission apparatus 10D includes a controlling section 110D and a communicating section 120D, as illustrated in FIG. 6. The communicating section 120D transmits and receives information to and from the remote control apparatus 20D over the network NW1. The controlling section 110D includes an acquiring section 11D, a status identifying section 12D, a region identifying section 13D, a transmitting section 14D, and an adjusting section 15D.

The controlling section 110D not only includes these functional blocks 11D to 15D but also has the function of controlling each of the sections of the backhoe 90 according to the remote control signal received from the remote control apparatus 20D. Described as an example is the case where the backhoe 90 operates by autonomous control. In this case, the controlling section 110D inputs, to each section of the backhoe 90, a motion control signal which corresponds to the remote control signal received from the remote control apparatus 20D. Described as another example is the case where the backhoe 90 includes an operation section for an operator to perform operation. In this case, the controlling section 110D inputs, to each section of the backhoe 90, a motion control signal which corresponds to the motion of the operation section operated by an attachment (not illustrated) according to the remote control signal. For example, the controlling section 110D swings some or all of the components, namely the swinging section 91, the boom 921, the arm 922, and the bucket 923, according to the remote control signal, to cause the backhoe 90 to perform work such as excavation, swing, or dirt dumping. As another example, the controlling section 110D causes the traveling section 93 to travel to cause the backhoe 90 to travel, according to the remote control signal.

The adjusting section 15D generates a post-adjustment video by adjusting the video acquired from the image capturing apparatus 31 such that a region outside a target region has a lower image quality than the target region. Each of the status identifying section 12D, the acquiring section 11D, and the transmitting section 14D is configured approximately the same as is the corresponding functional block assigned the same name in the first example embodiment. The details of the motion of each functional block of the controlling section 110D will be described later in "Flow of video transmission method S1D".

(Remote Control Apparatus 20D)

The remote control apparatus 20D includes a controlling section 210D and a communicating section 220D. The communicating section 220D transmits and receives information to and from the video transmission apparatus 10D over the network NW1. The controlling section 210D includes a decoding section 21D, a displaying section 22D, and an accepting section 23D.

The decoding section 21D decodes the post-adjustment video received from the video transmission apparatus 10D. The displaying section 22D displays, on the display 32, the video decoded by the decoding section 21D. The accepting section 23D accepts operation information inputted by the operator U with use of the operating apparatus 33. Further, the accepting section 23D transmits, to the video transmission apparatus 10D, a remote control signal which corresponds to the operation information. In a case where, for example, the operating apparatus 33 is a rod-shaped operation lever having an end which is fixed, the operation information includes a command which is indicated by the tilt, acceleration, direction, etc. of the operation lever and which is given to each portion.

<Flow of Video Transmission Method S1D>

Figure 8:
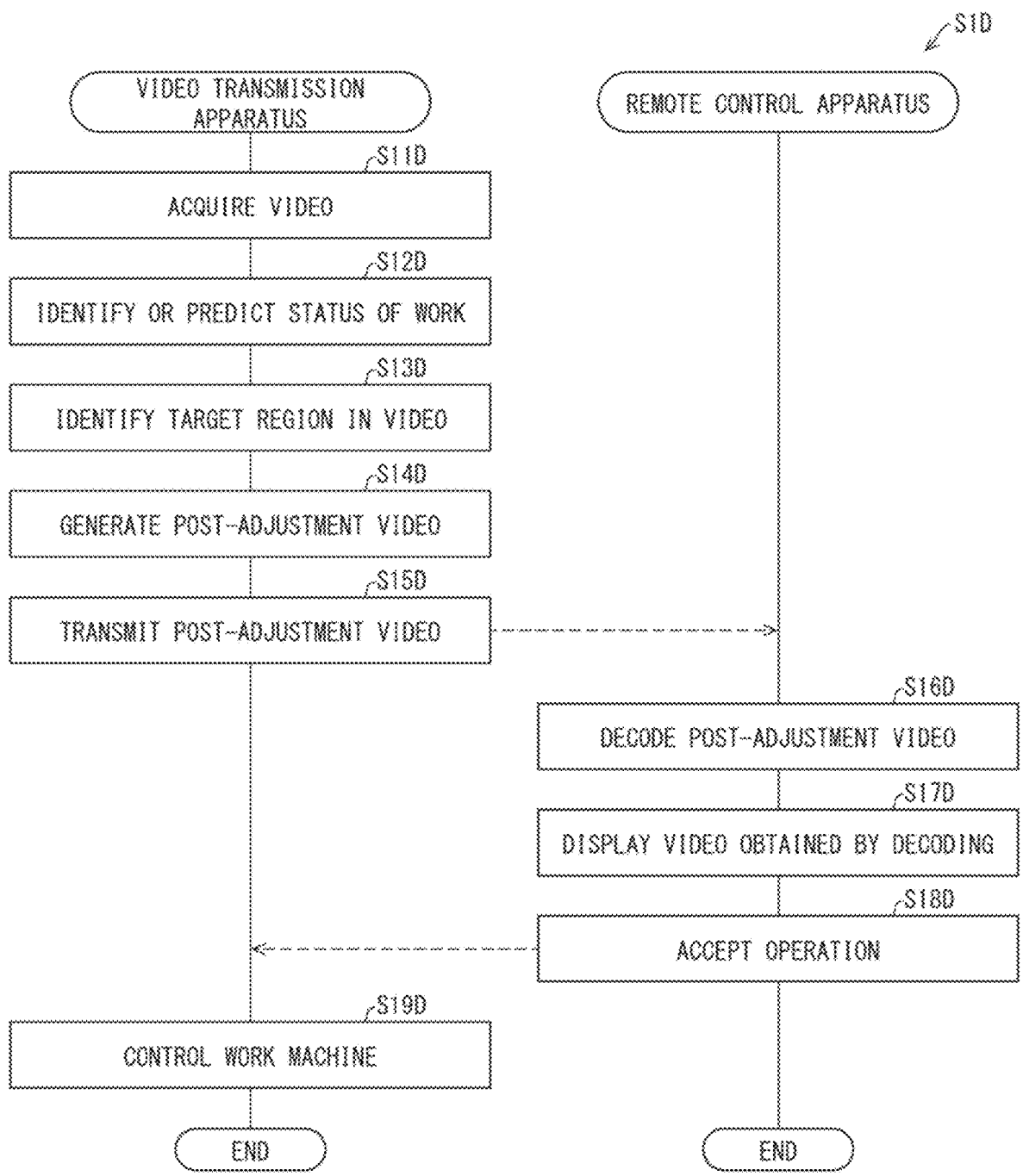
FIG. 8 is a flowchart illustrating a flow of a video transmission method in accordance with the second example embodiment of the present invention.

Here is a description of a flow of a video transmission method S1D carried out by the video transmission system 1D configured as described above, discussed with reference to FIG. 8. FIG. 8 is a flowchart for explaining a flow of the video transmission method SID. The video transmission method S1D includes steps S11D to S19D, as illustrated in FIG. 8.

(Step S11D)

In step S11D, the acquiring section 11D acquires a video captured by the image capturing apparatus 31.

(Step S12D)

In step S12D, the status identifying section 12D identifies the status of work performed, by the backhoe 90, on the dirt and sand OBJ. The status of work contains the status of the bucket 923 and the status of the dump truck 80. The status of the bucket 923 contains the position and motion of the bucket 923 and the presence or absence of the dirt and sand OBJ within the bucket 923. In other words, the status identifying section 12D identifies the status of work according to the status of work of the bucket 923, the status of work of the dump truck 80, or both. Examples of such a status of work include, but are not limited to, "excavation in progress", "immediately before swing", "swing in progress", "immediately before dirt dumping", "dirt dumping in progress", "immediately before travel", and "travel in progress".

Specific Example of Process of Identifying Status of Work

Here is a description of a specific example of the process of identifying the status of work. For example, the status identifying section 12D identifies the status of work by understanding work currently being performed by the backhoe 90. As another example, the status identifying section 12D may identify the status of work by predicting work to be performed by the backhoe 90 in the future.

For example, in a case where the work currently being performed by the backhoe 90 is "excavation", the status identifying section 12D identifies "excavation in progress" as the status of work. Further, in a case where the work predicted to be next performed by the backhoe 90 is "swing", the status identifying section 12D identifies "immediately before swing" as the status of work.

For example, the "excavation in progress" refers to being in a series of motions from sinking the teeth of the bucket 923 at an excavation point and tilting the bucket 923 to load the dirt and sand OBJ into the bucket 923 to lifting the bucket 923. Further, the "immediately before swing" refers to being immediately before the swinging section 91 swings.

For example, the status identifying section 12D refers to the result of analyzing the video acquired by the step S11D, to determine whether the following conditions (i) and (ii) are met: the condition (i) "whether the bucket 923 is contained in the video, and the dirt and sand OBJ is present in the bucket 923"; and the condition (ii) "whether the bucket 923 and the dump truck 80 are contained in the video, and the distance between the bucket 923 and the dump truck 80 is equal to or greater than a threshold".

Specific Example of Excavation in Progress

In a case where the condition (i) is not met (the dirt and sand OBJ is absent in the bucket 923) and the condition (ii) is met (the bucket 923 and the dump truck 80 are away from each other), the status identifying section 12D may identify "excavation in progress" as the status of work.

Specific Example of Immediately Before Swing

In a case where the condition (i) is met (the dirt and sand OBJ is present in the bucket 923) and the condition (ii) is met (the bucket 923 and the dump truck 80 are away from each other), the status identifying section 12D may identify "immediately before swing" as the status of work.

Specific Example of Swing in Progress

In a case where the condition (i) is not met (the dirt and sand OBJ is absent in the bucket 923) and the condition (ii) is not met (the bucket 923 and the dump truck 80 are close to each other), the status identifying section 12D may identify "swing in progress" as the status of work. Note that the "swing in progress" refers to the swinging section 91 being swinging.

Specific Example of Dirt Dumping in Progress

In a case where the condition (i) is met (the dirt and sand OBJ is present in the bucket 923) and the condition (ii) is not met (the bucket 923 and the dump truck 80 are close to each other), the status identifying section 12D may identify "immediately before dirt dumping" or "dirt dumping in progress" as the status of work.

Specific Example of Travel in Progress

Furthermore, the status identifying section 12D is not limited to the identification based on the conditions (i) and (ii) above, but may identify "travel in progress" as the status of work on the basis of changes in the video, changes in information on the position of the backhoe 90, and the like.

Examples of the changes in the video include changes in information on the position of the recognized dirt and sand OBJ in the video.

It should be noted that the conditions for identifying the status of work are not limited to "Specific example of excavation in progress", "Specific example of immediately before swing", "Specific example of swing in progress", "Specific example of dirt dumping in progress", and "Specific example of travel in progress" described above. The conditions for identifying the status of work may be other conditions with which the identification is carried out.

(Step S13D)

In step S13D, the region identifying section 13D identifies a target region in the video with reference to the result of identification carried out by the status identifying section 12D.

As an example of the specific process, the region identifying section 13D identifies the positions of the boom 921, the arm 922, and the bucket 923 in the video. Further, the region identifying section 13D refers to the respective positions of these portions identified, to identify a target region according to the status of work. Here is a description of a specific example of the target region.

Specific Example of Target Region Related to Excavation

Here is a description of a specific example of the target region for work related to excavation performed with use of the backhoe 90, discussed with reference to FIGS. 9 to 10.

Figure 9:
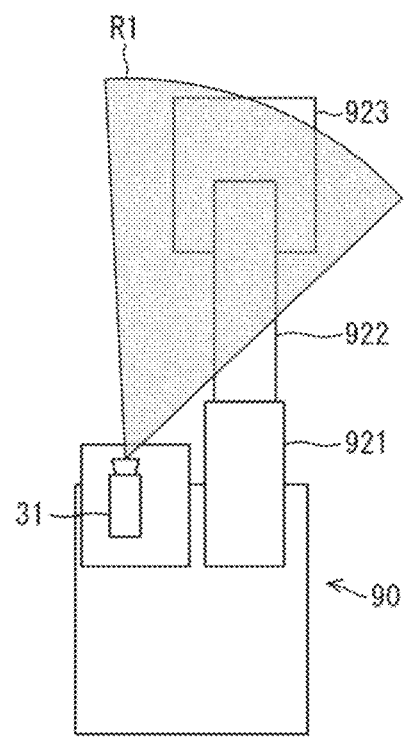
FIG. 9 is an explanatory representation of an example of a region of interest related to excavation.

FIG. 9 is an explanatory representation of an example of the region which is of interest to the operator U in a case where work related to excavation is performed with use of the backhoe 90, and is a top view of the backhoe 90. As illustrated in FIG. 9, in a case where work related to excavation is performed, the operator U focuses on a region of interest R1, which is a surrounding area of the bucket 923 and contains the bucket 923. When the status of work related to excavation is identified, the region identifying section 13D identifies a target region such that the target region corresponds to such a region of interest R1. In this respect, the region of interest R1 is a region in which the operator U takes an interest according to the status of work. In contrast, target regions R1a to R1c (described later) are regions in the video that are subjected to image quality adjustment. It should be noted that the region of interest R1 is illustrated in order to describe the target region, and does not necessarily need to be identified by the region identifying section 13D. In other words, the region identifying section 13D does not need to identify the line of sight of the operator U, unlike the apparatus disclosed in Patent Literature 1. The region identifying section 13D identifies, in the video, the target regions R1a to R1c, which will be described below.

Figure 10:
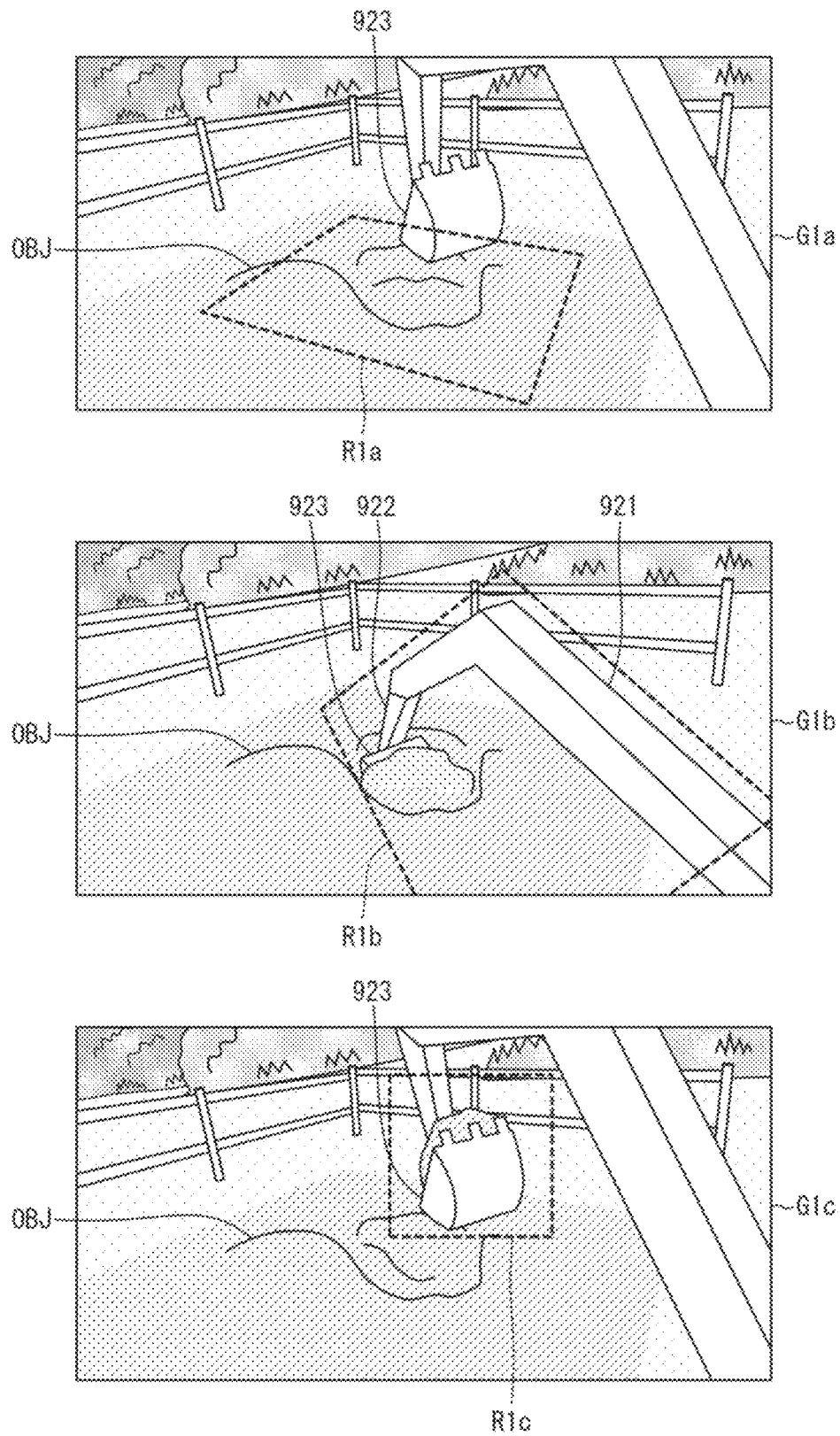
FIG. 10 is an explanatory representation of an example of a target region related to excavation.

FIG. 10 is an explanatory representation of an example of the target region for the case where the status of work related to excavation is identified. For example, the status of work related to excavation includes "immediately before excavation (a state of being before sinking the teeth of the bucket into dirt and sand)", "excavation in progress", or "excavation completed (a state of lifting the bucket 923 having the dirt and sand OBJ loaded thereon, to a predetermined height)". For example, in a case where "immediately before excavation" is identified as the status of work, the region identifying section 13D identifies the target region R1a in a video G1a. The target region R1a is a region containing, as the subject, the dirt and sand OBJ immediately below the bucket 923. With a clear display of such a target region R1a, it is possible for the operator U to check the shape of the dirt and sand OBJ and determine the position at which to lower the bucket 923, to operate the operating apparatus 33.

Further in a case where "excavation in progress" is identified as the status of work, the region identifying section 13D identifies the target region R1b in a video G1b. The target region R1b is a region which contains, as the subjects, the boom 921, the arm 922, the bucket 923, and the dirt and sand OBJ showing up in front of the bucket 923. With a clear display of such a target region R1b, it is possible for the operator U to check the shape of the dirt and sand OBJ showing up in front of the bucket 923 and the positional relationship among the articulation joints, to determine the motion of the bucket 923, thereby operating the operating apparatus 33.

Further in a case where "excavation completed" is identified as the status of work, the region identifying section 13D identifies the target region R1c in a video G1c. The target region R1c is a region which contains, as the subjects, the bucket 923 and the dirt and sand OBJ within the bucket 923. With a clear display of such a target region R1c, it is possible for the operator U to operate the operating apparatus 33 so as to adjust the amount of the dirt and sand OBJ within the bucket 923 or so as to move the bucket 923, while checking whether the dirt and sand OBJ loaded into the bucket 923 spills.

Specific Examples of Region of Interest and Target Region Related to Swing

Here are descriptions of specific examples of the region of interest and the target region for the case where the backhoe 90 performs work related to swing, discussed with reference to FIGS. 11 and 12.

Figure 11:
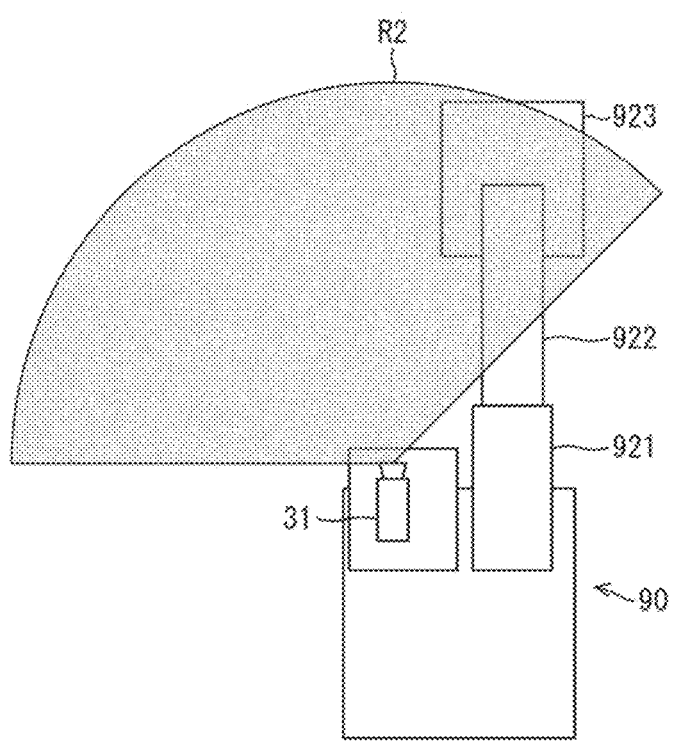
FIG. 11 is an explanatory representation of an example of a region of interest related to swing.

FIG. 11 is an explanatory representation of an example of the region which is of interest to the operator U in a case where work related to swing is performed with use of the backhoe 90, and is a top view of the backhoe 90. As illustrated in FIG. 10, in a case of performing work related to swing, the operator U focuses on a region of interest R2 which contains the bucket 923 and which extends to the left from the bucket 923. Here, the bucket 923 is intended to swing counterclockwise. When the status of work related to swing is identified, the region identifying section 13D identifies a target region such that the target region corresponds to such a region of interest R2. It should be noted that the region of interest R2 is a space region illustrated for the description of the target region, and does not necessarily need to be identified by the region identifying section 13D. The region identifying section 13D identifies target regions R2a and R2b (described below) in the video.

Figure 12:
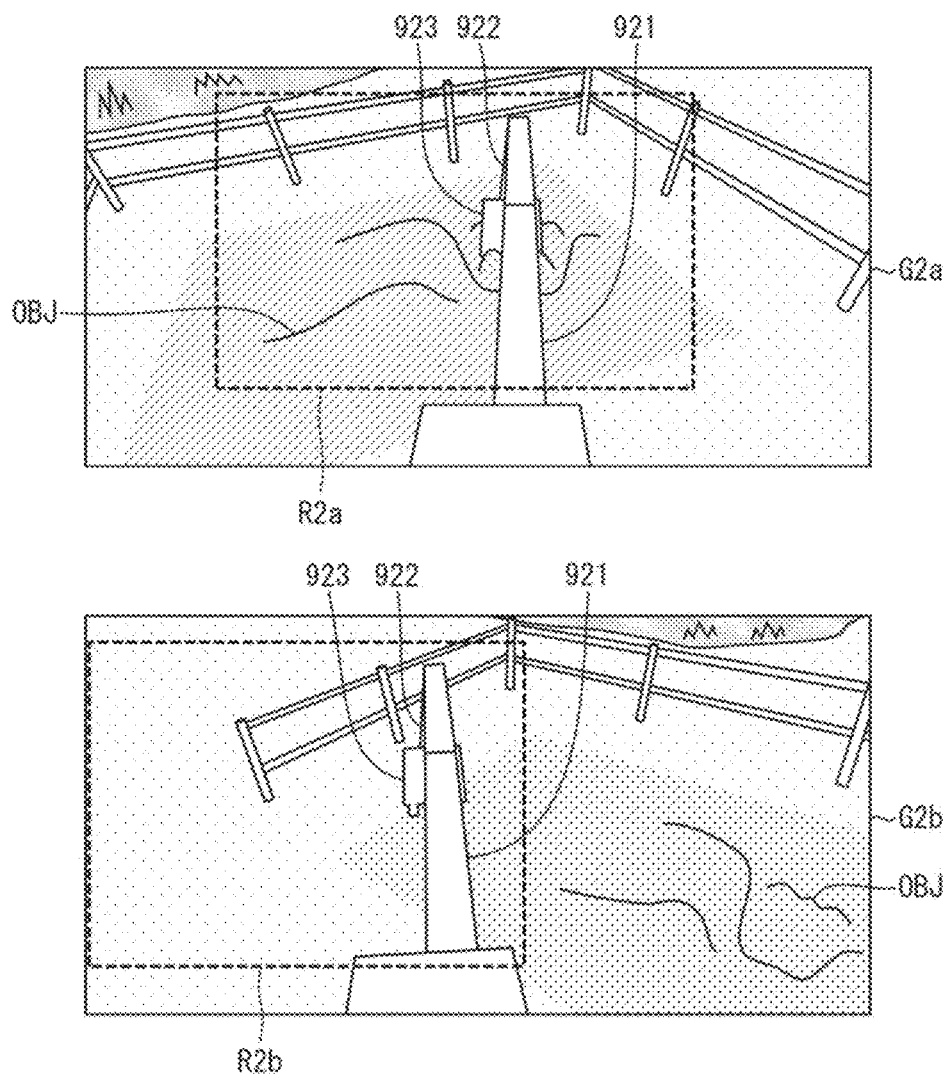
FIG. 12 is an explanatory representation of an example of a target region related to swing.

FIG. 12 is an explanatory representation of an example of the target region for the case where the status of work related to swing is identified. For example, the status of work identified in relation to swing includes "immediately before swing" and "swing in progress". For example, in a case where "immediately before swing" is identified as the status of work, the region identifying section 13D identifies the target region R2a in a video G2a. The target region R2a is a region which contains, as the subjects, the boom 921, the arm 922, the bucket 923, and the dirt and sand OBJ. With a clear display of such a target region R2a, it is possible for the operator U to check the situation around the boom 921 and determine safety, to operate the operating apparatus 33 to start swing.

Further, in a case where "swing in progress" is identified as the status of work, the region identifying section 13D identifies the target region R2b in a video G2b. The target region R2b is a region which contains, as the subjects, the boom 921, the arm 922, and the bucket 923 and which extends to the left from each of these parts. With a clear display of such a target region R2b, it is possible for the operator U to operate the operating apparatus 33 to continue swinging while determining the safety of the swing direction (counterclockwise swing).

Specific Examples of Region of Interest and Target Region Related to Travel

Here is descriptions of specific examples of the region of interest and the target region for the case of performing work related to travel, discussed with reference to FIGS. 13 and 14.

Figure 13:
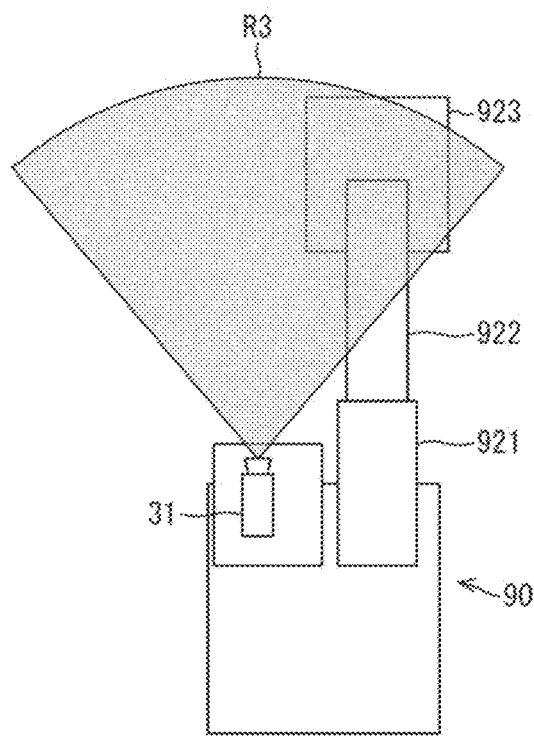
FIG. 13 is an explanatory representation of an example of a region of interest related to travel.

FIG. 13 is an explanatory representation of an example of the region which is of interest to the operator U in a case where work related to travel is performed with use of the backhoe 90, and is a top view of the backhoe 90. As illustrated in FIG. 13, in a case of performing work related to travel, the operator U focuses on a region of interest R3 which contains a region corresponding to the travel direction of the backhoe 90. When the status of work related to travel is identified, the region identifying section 13D identifies a target region such that the target region corresponds to such a region of interest R3. It should be noted that the region of interest R3 is a space region illustrated for the description of the target region, and does not necessarily need to be identified by the region identifying section 13D. The region identifying section 13D identifies target region R3a (described below) in the video.

Figure 14:
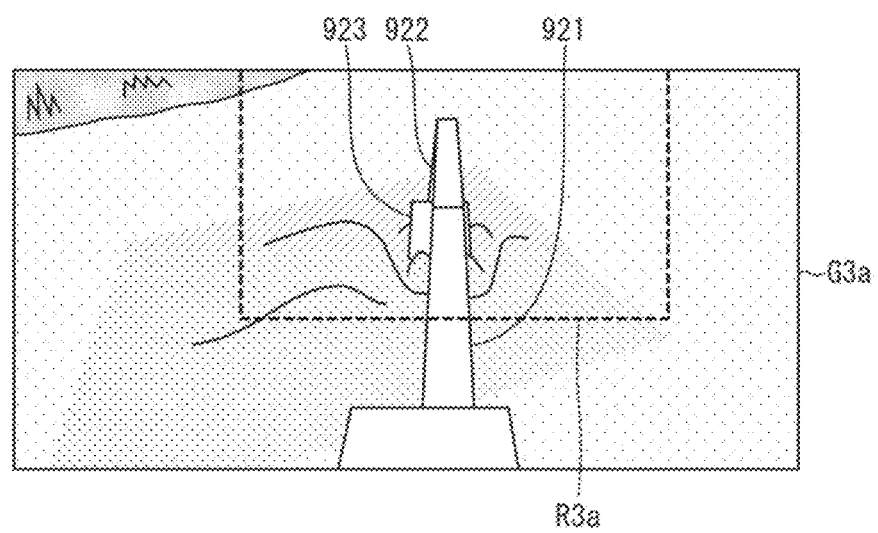
FIG. 14 is an explanatory representation of an example of a target region related to travel.

FIG. 14 is an explanatory representation of an example of the target region for the case where work related to travel is identified. For example, the status of work related to travel includes "immediately before forward travel". For example, in a case where "immediately before forward travel" is identified as the status of work, the region identifying section 13D identifies the target region R3a in a video G3a. The target region R3a is a region which contains, as the subjects, the boom 921, the arm 922, and the bucket 923. With a clear display of such a target region R3a, it is possible for the operator U to operate the operating apparatus 33 so as to start travelling, while determining the safety of a forward area.

(Step S14D)

In step S14D, the adjusting section 15D generates a post-adjustment video by adjusting the video acquired in step S11D such that a region outside the target region has a lower image quality than the target region. A specific example of the image quality to be adjusted is as described in the first example embodiment. As a technique for adjusting a relative image quality between the target region and a region outside the target region to encode the post-adjustment video, a known technique can be adopted.

(Step S15D)

The transmitting section 14D transmits, to the remote control apparatus 20D, the post-adjustment video generated. With such a post-adjustment video, it is possible to reduce the communication traffic in connection with transmission, compared with the video before the adjustment. Thus, in the present step, the chance of making it possible to sufficiently transmit the post-adjustment video increases even in a case of a changing communication quality.

(Step S16D)

In step S16D, the decoding section 21D of the remote control apparatus 20D decodes the post-adjustment video received.

(Step S17D)

Figure 15:
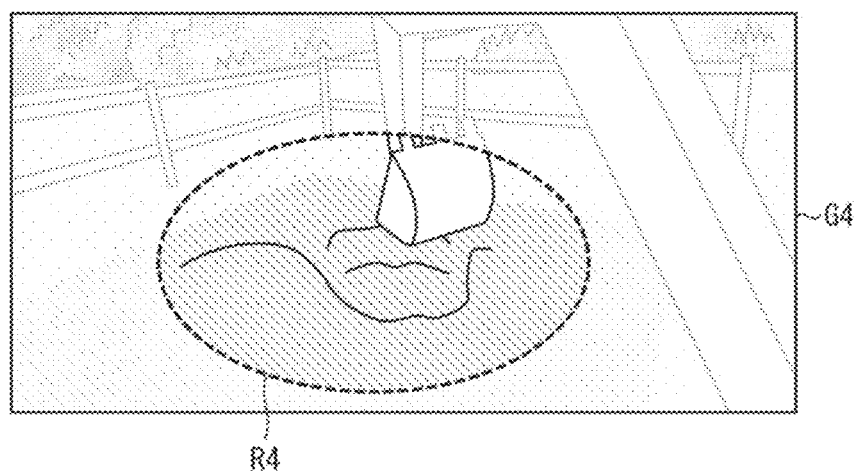
FIG. 15 is an explanatory representation of an example of a video displayed by a remote control apparatus.

In step S17D, the displaying section 22D displays an image obtained by the decoding. Here is a specific example of the image displayed, discussed with reference to FIG. 15. FIG. 15 is a representation illustrating a specific example of the video displayed by the remote control apparatus 20D on the display 32. In FIG. 15, a video G4 displayed on the display 32 contains a target region R4. The video G4 is a video obtained by decoding the post-adjustment video having been adjusted such that the image quality of a region outside the target region R4 is lower than the image quality of the target region R4. Therefore, the image quality of the region outside the target region R4 is lower than the target region R4. At the same time, the image quality of the target region R4 is expected to be clear.

(Step S18D)

In step S18D, the accepting section 23D accepts operation information inputted by the operator U with use of the operating apparatus 33. With a clear display of the target region R4, it is possible for the operator U to accurately perform an operation according to the status of work. Further, the accepting section 23D transmits, to the video transmission apparatus 10D, a remote control signal which corresponds to the operation information.

(Step S19D)

In step S19D, the controlling section 110D of the video transmission apparatus 10D controls the motion of the backhoe 90 according to the remote control signal received.

Example Advantage of Present Example Embodiment

The present example embodiment produces not only the same example advantage that is produced by the first example embodiment but also the following example advantage.

In the present example embodiment, the configuration in which the status of work identified by the status identifying section 12D includes the status of the bucket 923, etc. of the backhoe 90 is adopted. With this configuration, it is possible for the status identifying section 12D to more accurately determine the status of work, which includes the statuses of the bucket 923 such as "excavation in progress", "immediately before swing", and "swing in progress". As a result, it is possible to more accurately determine the target region according to the status of the bucket 923, etc.

Further, in the present example embodiment, the configuration in which the status of work identified by the status identifying section 12D includes the status of the dump truck 80, which is another work machine is adopted. With this configuration, it is possible for the status identifying section 12D to more accurately determine the status of work, which includes the statuses of the dump truck 80 such as "immediately before dirt dumping", and "dirt dumping in progress". As a result, it is possible to more accurately determine the target region according to the status of the dump truck 80.

Furthermore, in the present example embodiment, the configuration in which the status identifying section 12D identifies the status of work with reference to at least the result of analyzing a video is adopted. With this configuration, it is possible for the status identifying section 12D to more accurately determine the status of work on the basis of information obtained from the video. As a result, it is possible to more accurately determine the target region according to the status of work.

Third Example Embodiment

The following description will discuss a third example embodiment of the present invention in detail, with reference to the drawings. A component that has the same function as a component described in the first or second example embodiment is assigned the same reference sign, and the description thereof is omitted where appropriate.

<Configuration of Video Transmission System 1E>

Figure 16:
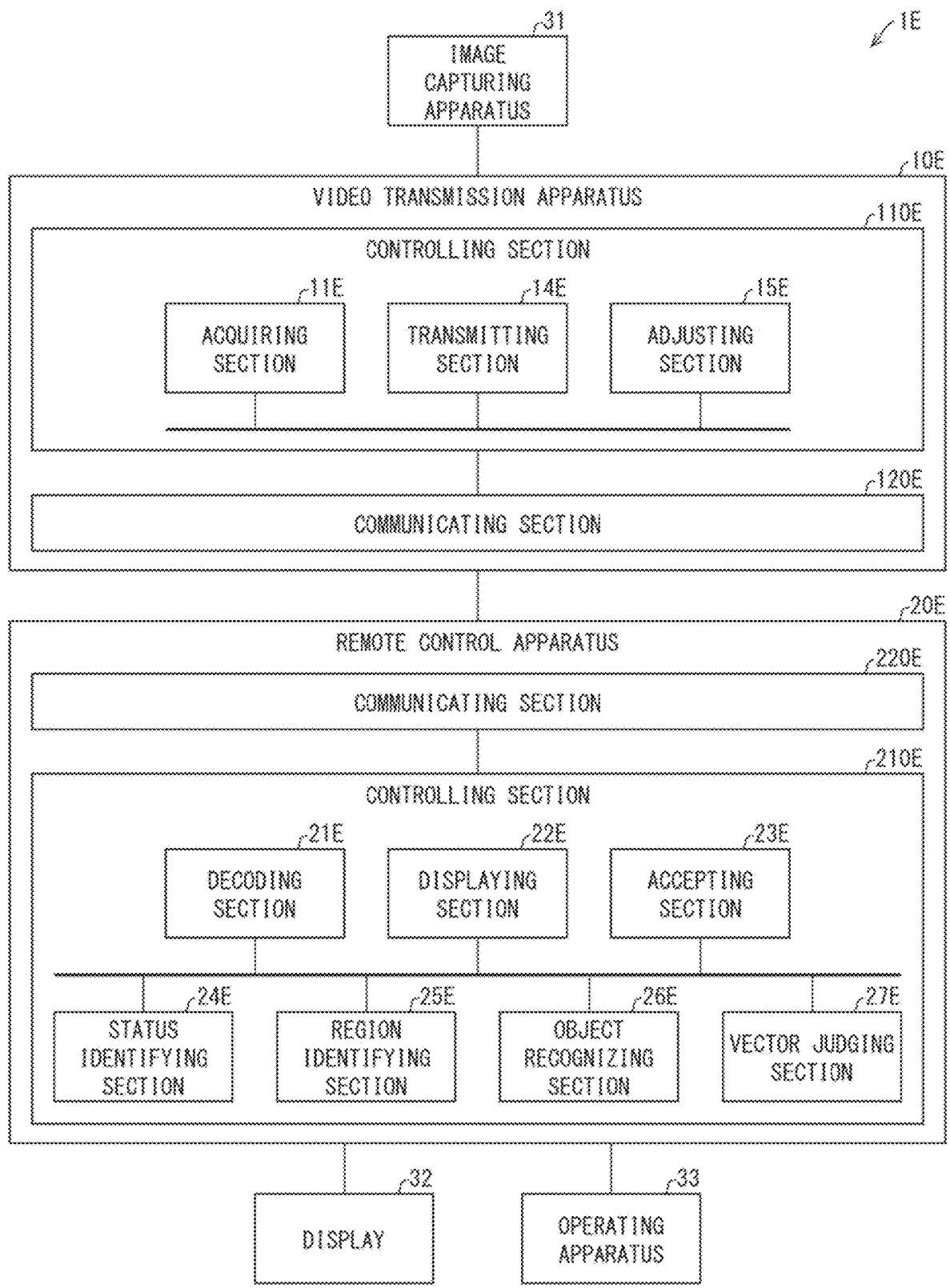
FIG. 16 is a block diagram illustrating a configuration of a video transmission system in accordance with a third example embodiment of the present invention.

Here is a description of a configuration of a video transmission system 1E in accordance with the present example embodiment, discussed with reference to FIG. 16. FIG. 16 is a block diagram illustrating a configuration of the video transmission system 1E.

As illustrated in FIG. 16, the video transmission system 1E is configured approximately the same as the video transmission system 1D in accordance with the second example embodiment. However, there are differences which are the following points: a video transmission apparatus 10E is included instead of the video transmission apparatus 10D; and a remote control apparatus 20E is included instead of the remote control apparatus 20D. The other points are as described in the second example embodiment.

According to the second example embodiment, the status identifying section 12D and the region identifying section 13D are disposed in the video transmission apparatus 10D, whereas according to the present example embodiment, a status identifying section 24E and a region identifying section 25E are disposed in the remote control apparatus 20E.

The video transmission apparatus 10E includes an acquiring section 11E, a transmitting section 14E, and an adjusting section 15E. Each of the acquiring section 11E, the transmitting section 14E, and the adjusting section 15E is configured approximately the same as is the corresponding functional block assigned the same name in the second example embodiment.

The remote control apparatus 20E includes a decoding section 21E, a displaying section 22E, an accepting section 23E, a status identifying section 24E, a region identifying section 25E, an object recognizing section 26E, and a vector judging section 27E. Each of the decoding section 21E, the displaying section 22E, and the accepting section 23E is configured approximately the same as is the corresponding functional block assigned the same name in the second example embodiment. The status identifying section 24E is configured approximately the same as is the status identifying section 12D in the second example embodiment. Unlike the status identifying section 12D, the status identifying section 24E refers to the result of recognition carried out by the object recognizing section 26E. The region identifying section 25E is configured approximately the same as is the region identifying section 13D in the second example embodiment. Unlike the region identifying section 13D, the region identifying section 25E further refers to the result of judgment carried out by the vector judging section 27E. The details of the status identifying section 24E, the region identifying section 25E, the object recognizing section 26E, and the vector judging section 27E will be described in "Flow of video transmission method S1E" below.

<Flow of Video Transmission Method S1E>

Figure 17:
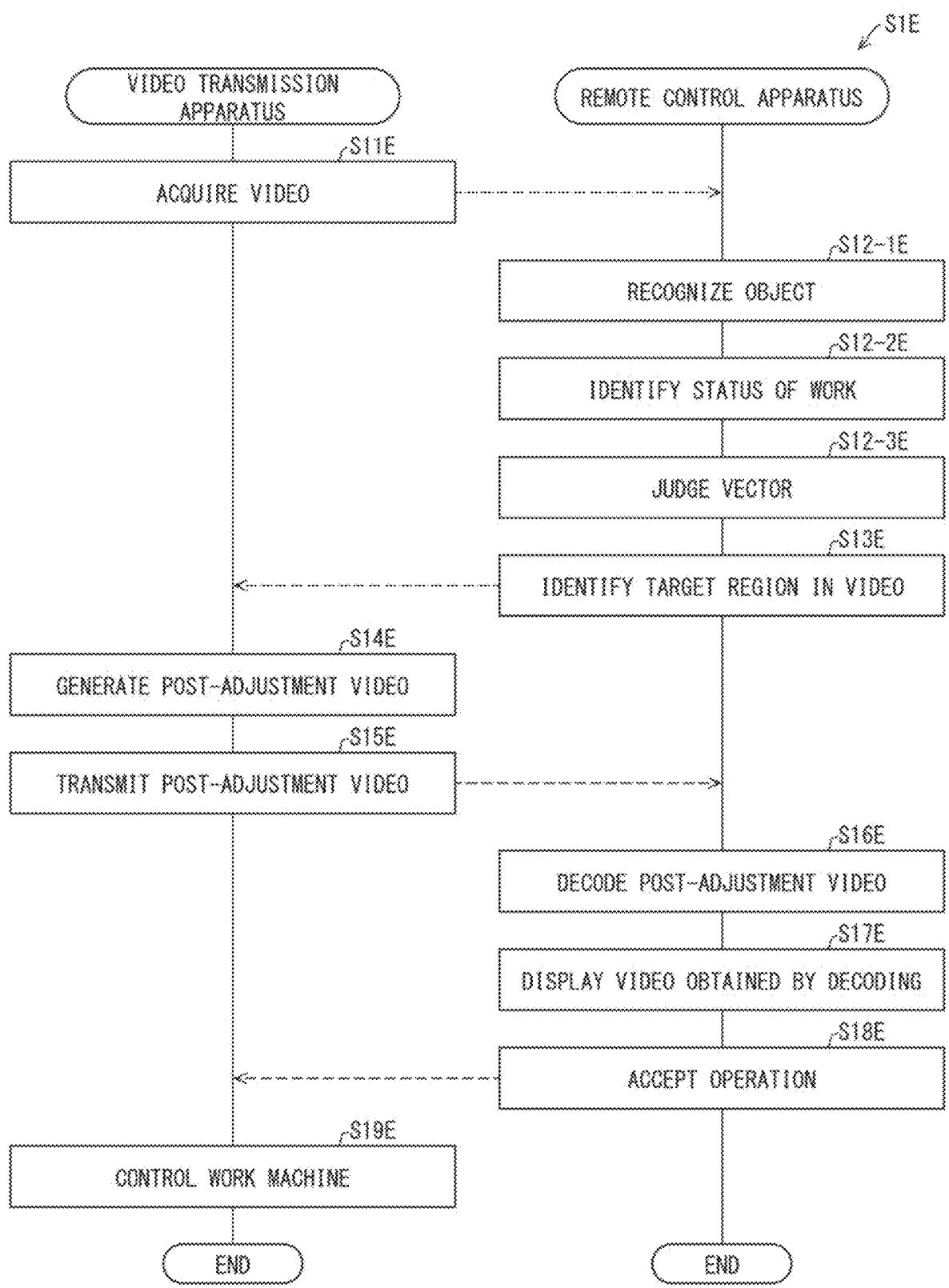
FIG. 17 is a flowchart illustrating a flow of a video transmission method in accordance with the third example embodiment of the present invention.

Here is a description of a flow of a video transmission method S1E carried out by the video transmission system 1E configured as described above, discussed with reference to FIG. 17. FIG. 17 is a flowchart for explaining a flow of the video transmission method S1E. The video transmission method S1E includes steps S11E to S19E, as illustrated in FIG. 17. The processes of steps S14E to S19E are the same as those of steps S14D to S19D of the video transmission method S1D in accordance with the second example embodiment. Thus, described here are step S11E, steps S12-1E, S12-2E, and S12-3E, and step S13E.

(Step S11E)

In step S11E, the acquiring section 11E acquires a video captured by an image capturing apparatus 31. Further, the acquiring section 11E transmits, to the remote control apparatus 20E, the video acquired.

(Step S12-1E)

In step S12-1E, the object recognizing section 26E of the remote control apparatus 20E refers to the video acquired in step S11E, to recognize an object contained in the video. The object recognizing section 26E is a functional block for recognizing an object contained in a video. In the object recognizing section 26E, a known technique for recognizing an object contained in a video can be adopted. For example, the object recognizing section 26E recognizes an object which is, for example, a working portion (such as a boom 921, an arm 922, or a bucket 923) of a backhoe 90, a dump truck 80, or dirt and sand OBJ and which is contained in the video.

(Step S12-2E)

In step S12-2E, the status identifying section 24E identifies the status of work performed, by the backhoe 90, on the dirt and sand OBJ with reference to the result of recognition (i.e., the result of analyzing the video) carried out by the object recognizing section 26E.

For example, in a case where the result of recognition carried out by the object recognizing section 26E indicates the bucket 923 and the dirt and sand OBJ within the bucket 923, the status identifying section 24E may identify, as the status of work, "immediately before dirt dumping" meaning that dirt dumping is going to be performed.

(Step S12-3E)

In step S12-3E, the vector judging section 27E refers to the video acquired in step S11E, to judge a direction (hereinafter, referred to as a vector) in which regions containing the same subject move in the video. The video acquired in step S11E can contain a temporal series of a plurality of still images. As such, the vector judging section 27E extracts regions containing the same subject in the plurality of still images, to judge the vector of the regions. Further, the vector judging section 27E may use the temporal series of still images the number of which is necessary for the determination of the vector, to determine the vector. It should be noted that the step S12-2E and the step S12-3E may be carried out in an order which is not necessarily this order.

(Step S13E)

In step S13E, the region identifying section 25E identifies a target region in the video acquired in step S11E with reference to the result (status of work) of identification carried out by the status identifying section 24E and the result (vector) of determination carried out by the vector judging section 27E. In addition, the region identifying section 25E transmits the result of the identification to the video transmission apparatus 10E.

As an example, the region identifying section 25E may extend the target region identified according to the status of work, in the direction of the vector, which is the result of the judgment. For example, in a case where the status of work is "excavation in progress" and the vector is "upward direction", the target region may be a region obtained by extending, in the upward direction, the target region R1$b$ in the video G1$b$ illustrated in FIG. 10. Further, the region identifying section 25E may move the target region identified according to the status of work, on the basis of the vector, which is the result of the judgment. This causes the target region to move in response to, for example, the motion of the bucket 923.

Example Advantage of Present Example Embodiment

The present example embodiment produces not only the same example advantage that is produced by the first example embodiment but also the following example advantage.

In the present example embodiment, the configuration in which the status identifying section 24E identifies the status of work performed, by the backhoe 90, on the dirt and sand OBJ with reference to the result (i.e., the result of analyzing a video) of recognition carried out by the object recognizing section 26E is adopted. With this configuration, it is possible to more accurately determine the status of work on the basis of the object recognized from the video.

In addition, in the present example embodiment, the configuration in which the region identifying section 25E identifies a target region in the video acquired in step S11E with reference to the result (status of work) of identification carried out by the status identifying section 24E and the result (vector) of judgment carried out by the vector judging section 27E is adopted. With this configuration, not only the status of work but the motion in the video is also taken into consideration, and it is therefore possible to more accurately determine the target region.

Further, according to the present example embodiment, the status identifying section 24E is disposed in the remote control apparatus 20E. This makes it possible to reduce the load on the video transmission apparatus 10E, compared with the case where the status identifying section 24E is disposed in the video transmission apparatus 10E.

Fourth Example Embodiment

The following description will discuss a fourth example embodiment of the present invention in detail, with reference to the drawings. A component that has the same function as a component described in the first, second, or third example embodiment is assigned the same reference sign, and the description thereof is omitted where appropriate.

<Configuration of Video Transmission System 1F>

Figure 18:
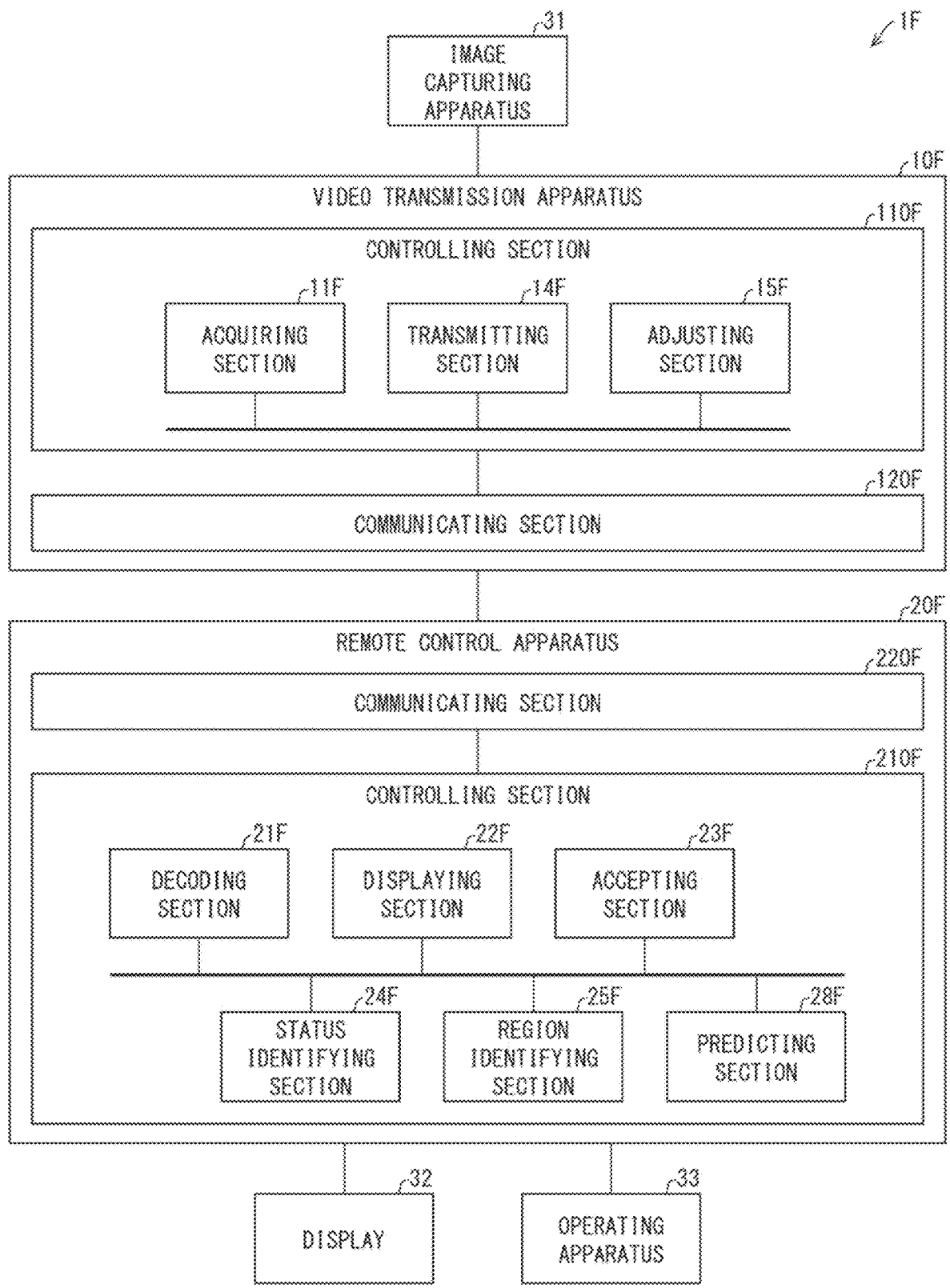
FIG. 18 is a block diagram illustrating a configuration of a video transmission system in accordance with a fourth example embodiment of the present invention.

Here is a description of a configuration of a video transmission system 1F in accordance with the present example embodiment, discussed with reference to FIG. 18. FIG. 18 is a block diagram illustrating a configuration of the video transmission system 1F.

As illustrated in FIG. 18, the video transmission system 1F is configured approximately the same as the video transmission system 1E in accordance with the third example embodiment. However, there are differences which are the following points: a video transmission apparatus 10F is included instead of the video transmission apparatus 10E;

and a remote control apparatus 20F is included instead of the remote control apparatus 20E. The other points are as described in the third example embodiment.

The video transmission apparatus 10F includes an acquiring section 11F, a transmitting section 14F, and an adjusting section 15F. Each of the acquiring section 11F, the transmitting section 14F, and the adjusting section 15F is configured approximately the same as is the corresponding functional block assigned the same name in the third example embodiment.

The remote control apparatus 20F includes a decoding section 21F, a displaying section 22F, an accepting section 23F, a status identifying section 24F, a region identifying section 25F, and a predicting section 28F. The predicting section 28F is an example component for implementing the predicting means recited in the claims. Each of the decoding section 21F, the displaying section 22F, the accepting section 23F, the status identifying section 24F, and the region identifying section 25F is configured approximately the same as is the corresponding functional block assigned the same name in the third example embodiment. However, the status identifying section 24F has a difference in that the status identifying section 24F refers to at least information which indicates the phase of work performed by a backhoe 90. Further, the region identifying section 25F has a difference in that the region identifying section 25F further refers to the result of prediction carried out by the predicting section 28F. The details of the status identifying section 24F, the region identifying section 25F, and the predicting section 28F will be described in "Flow of video transmission method SIF" below.

<Flow of Video Transmission Method S1F>

Figure 19:
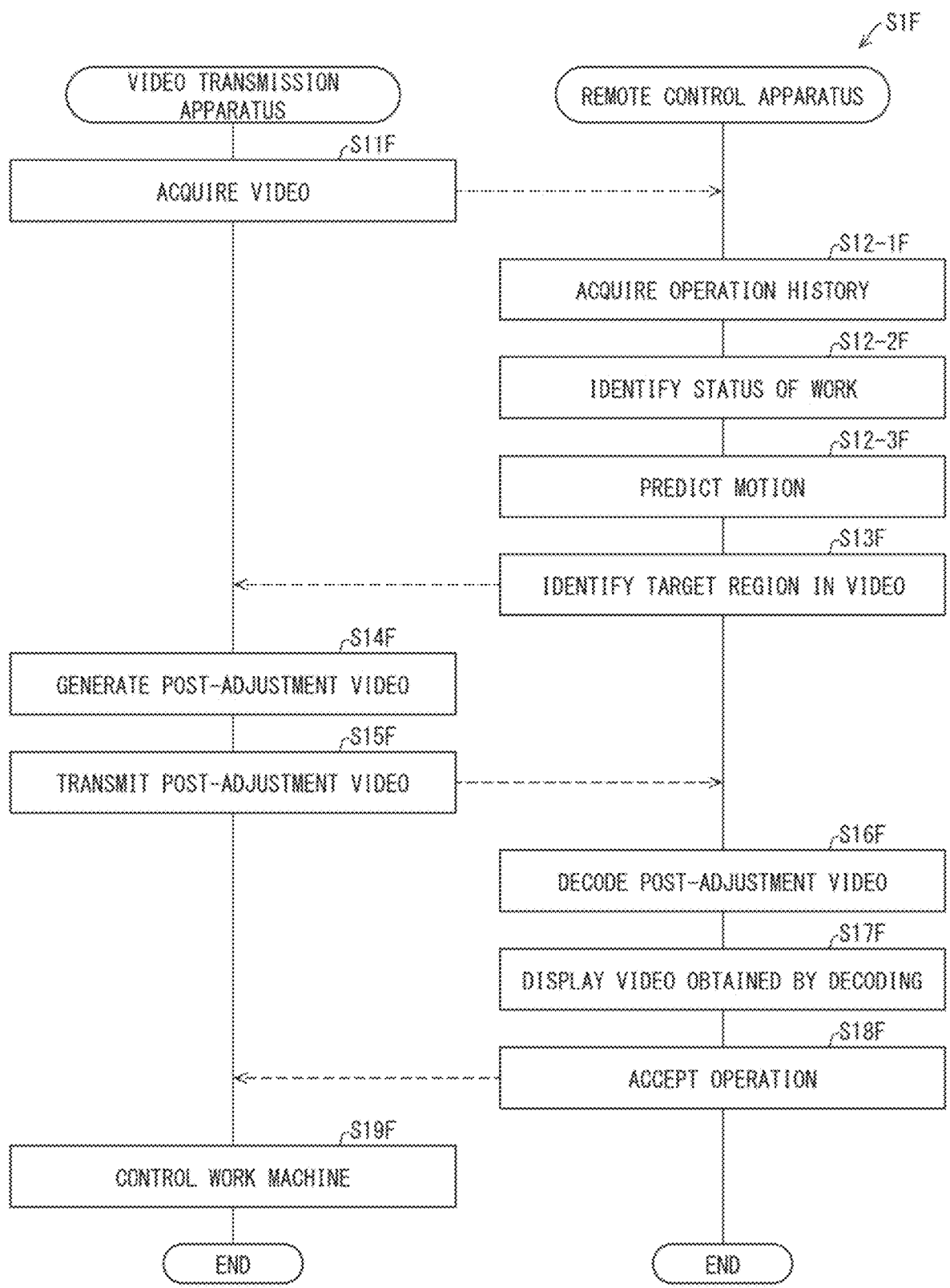
FIG. 19 is a flowchart illustrating a flow of a video transmission method in accordance with the fourth example embodiment of the present invention.

Here is a description of a flow of a video transmission method SIF carried out by the video transmission system 1F configured as described above, discussed with reference to FIG. 19. FIG. 19 is a flowchart for explaining a flow of the video transmission method S1F. The video transmission method S1F includes steps S11F to S19F, as illustrated in FIG. 19. The processes of step S11F and steps S14F to S19F are the same as those of steps S11E and S14E to S19E of the video transmission method SIE in accordance with the third example embodiment. Thus, described here are steps S12-1F, S12-2F, S12-3F, and S13F.

(Step S12-1F)

In step S12-1F, the status identifying section 24F acquires an operation information history. The operation information is information inputted to an operating apparatus 33 by an operator U for remotely controlling the backhoe 90. For example, the operation information includes information of (i) opening/closing a bucket 923, (ii) flexing/extending a boom 921 at the first articulation joint thereof, (iii) flexing/extending the boom 921 at the second articulation joint thereof, (iv) swing, or (v) travel. However, the operation information is not limited thereto. Note that the operation information history acquired in this step is the history of pieces of operation information accepted so far by the accepting section 23F.

(Step S12-2F)

In step S12-2F, the status identifying section 24F identifies the status of work with reference to at least information which indicates the phase of work. Specifically, the information which indicates the phase of work includes information which indicates the timing at which the phase of work switches. For example, the status identifying section 24F identifies, on the basis of the operation information history, the timing at which the phase of work switches. The status identifying section 24F identifies, on the basis of the timing at which the phase of work switches, the status of work performed by the backhoe 90. For example, the phase of work is "excavation", "swing", "dirt dumping", or "travel", and these kinds of work are intended to be performed in this order.

Specific Example 1: From Excavation to Swing

As a specific example, in a case where, for example, the above types (i), (ii), and (iii) of operation information described above appear at a frequency equal to or greater than a threshold, and the operation information (iv) appears thereafter in the operation information history, the status identifying section 24F identifies, as the timing, a timing t1 at which the work switches from excavation to swing.

Specific Example 2: From Swing to Dirt Dumping

Further, in a case where the operation information (iv) described above in the specific example 1 appears, and the types (i), (ii), and (iii) of operation information appear at a frequency equal to or greater than a threshold thereafter in the operation information history, the status identifying section 24F identifies, as the timing, a timing t2 at which the work switches from swing to dirt dumping.

Specific Example 3: From Dirt Dumping to Swing

Further, in a case where the types (i), (ii), and (ii) of operation information described above in the specific example 2 appear at the frequency equal to or greater than the threshold, and the operation information (iv) appears thereafter in the operation information history, the status identifying section 24F identifies, as the timing, a timing t3 at which the work switches from dirt dumping to swing.

Specific Example 4: From Swing to Excavation

Further, in a case where the operation information (iv) described above in the specific example 3 appears, and the types (i), (ii), and (iii) of operation information appear at a frequency equal to or greater than a threshold thereafter in the operation information history, the status identifying section 24F identifies, as the timing, a timing t4 at which the work switches from swing to excavation.

Specific Example 5: Travel

Furthermore, in a case where the above-described operation information (v) appears following the specific example 4 in the operation information history, the status identifying section 24F identifies, as the timing, a timing t5 at which the work switches to travel.

In this manner, the status identifying section 24F identifies, on the basis of the operation information history, the timing at which the phase of work switches, and identifies the status of work with reference to the timing identified. For example, the status identifying section 24F can identify "swing in progress" as the status of work, between the above-described timing t1 and timing t2. In addition, the status identifying section 24F transmits the result of identification to the video transmission apparatus 10F.

(Step S12-3F)

In step S12-3F, the predicting section 28F predicts the motion of the backhoe 90. For example, the predicting section 28F acquires the direction in which the bucket 923 moves in the video, with reference to the result of analyzing the video. Further, the predicting section 28F predicts, on the basis of the movement direction acquired, a direction (predicted direction) in which the bucket 923 will move in the future. As another example, the predicting section 28F may predict the motion of the backhoe 90 with reference to information in which the operation information history is associated with the amount of motion of a portion (e.g., bucket 923) of the backhoe 90, the portion corresponding to the history. As still another example, the predicting section 28F may identify how many speeds and widths a portion (e.g., bucket 923) of the backhoe 90 moves in a screen on which the video is displayed, to predict the motion of the backhoe 90.

(Step S13F)

In step S13F, the region identifying section 25F identifies a target region in the video acquired in step S11F, with reference to the result (status of work) of identification carried out by the status identifying section 24F and the result (predicted direction) of prediction carried out by the predicting section 28F. As an example, the region identifying section 25F may extend the target region identified according to the status of work, in the predicted direction. For example, in a case where the status of work is "excavation in progress" and the predicted direction is "upward direction" in the video, the target region may be a region obtained by extending the target region R1$b$ of the video Glb illustrated in FIG. 10 in the upward direction by the region size of the bucket 923. Further, the region identifying section 25F may move, on the basis of the predicted direction, the target region identified according to the status of work. This causes the target region to move in response to, for example, the predicted motion of the bucket 923.

According to the present example embodiment, the status identifying section 24F may identify the status of work with reference to not only the operation information history of a single operator U but also a database in which the operation information histories of a plurality of operators are brought together. For example, the plurality of operators may be operators who remotely operate the same backhoe 90 at their respective times different from each other, or may be operators who remotely operate their respective backhoes 90. Further, the status identifying section 24F may identify the status of work with use of an estimation model which receives the operation information history as an input and outputs the status of work. Such an estimation model may be generated by machine learning in which such operation information histories of the plurality of operators U are used as labeled training data.

Example Advantage of Present Example Embodiment

The present example embodiment produces not only the same example advantage that is produced by the first example embodiment but also the following example advantage.

In the present example embodiment, the configuration in which the status identifying section 24F identifies the status of work with reference to at least information which indicates the phase of work performed by the backhoe 90 is adopted. For example, in a case where a plurality of phases of work are intended to be performed in sequence, it is possible for the status identifying section 24F to more accurately identify the status of work by identifying timings at which the phases of work switch.

Further, according to the present example embodiment, the status identifying section 24F determines a switch of the phases of work on the basis of the operation information history of an operator U, and identifies the status of work on the basis of the result of the determination. In most cases, the process of referring to the operation information history is carried out at a lighter load than is the process of referring to the result of analyzing the video. Thus, it is possible to reduce the load at which the process of identifying the status of work is carried out.

In addition, in the present example embodiment, the configuration in which the predicting section 28F predicts the motion of the backhoe 90 (bucket 923) and the region identifying section 25F identifies the target region with reference to the result (status of work) of identification carried out by the status identifying section 24F and the result of prediction carried out by the predicting section 28F is adopted. With this configuration, not only the status of work but the predicted motion of the backhoe 90 is also taken into consideration, and it is therefore possible to more accurately determine a target region such that the target region matches a region which will be of interest to the operator U according to the work to be performed by the backhoe 90 in the future.

[Variation 1]

The example embodiments above can be varied as follows. In each of the example embodiments, the acquiring section 11 (11D, 11E, 11F) may further acquire communication situation information which indicates the situation of communication conducted over a transmission path used by the transmitting section 14 (14D, 14E, 14F). In this case, the transmitting section 14 (14D, 14E, 14F) identifies a relative image quality between the target region and a region outside the target region, with reference to the acquired communication situation information. For example, the transmitting section 14 (14D, 14E, 14F) may identify, as the relative image quality, the absence of difference in image quality between the target region and the region outside the target region. In this case, the transmitting section transmitting section 14 (14D, 14E, 14F) transmits the video as acquired by the acquiring section 11 (11D, 11E, 11F). As another example, the transmitting section 14 (14D, 14E, 14F) may identify, as to the relative image quality, a high image quality of the target region as compared to that of the region outside the target region. The relative image quality is represented by, for example, respective adjustment parameters for the target region and the region outside the target region of an image. In this case, the transmitting section 14 (14D, 14E, 14F) transmits a post-adjustment video. In other words, the transmitting section 14 (14D, 14E, 14F) may refer to the communication situation information, to switch between transmitting a video as acquired by the acquiring section 11 (11D, 11E, 11F) and transmitting the post-adjustment video.

Also in this case, the communication situation information may contain information on the prediction of future communication situation. Also in this case, the communication situation information may contain the history of past communication situations.

With these variations, according to each of the example embodiments, it is possible to clearly present the inside of the target region with use of the post-adjustment video in a case of a communication situation having a quality lower than a predetermined quality, and clearly present, to the operator U, the whole video not having undergone adjustment in a case of a communication situation having a quality higher than the predetermined quality. As a result, the operability of an operator further improves.

[Variation 2]

Further, in each of the above-described example embodiments, the region identifying section 13 (13D, 13E, 13F) may cause the size of the target region to change according to the communication quality. For example, the region identifying section 13 (13D, 13E, 13F) may make the size of the target region smaller when the communication quality is worse. Further, the region identifying section 13 (13D, 13E, 13F) may cause the image qualities of the inside and the outside of the target region to change according to the communication quality. For example, the region identifying section 13 (13D, 13E, 13F) may make worse the image quality of the region outside the target region when the communication quality is worse.

With these variations, according to each of the example embodiments, it is possible to more stably transmit the post-adjustment video for a clear display of at least the target region.

[Variation 3]

According to the fourth example embodiment, the accepting section 23F may acquire operation information which contains the voice of the operator U. In this case, the status identifying section 24F identifies the status of work performed by the backhoe 90, with reference to a voice-containing operation information history.

[Variation 4]

The descriptions of the second to fourth example embodiments above focus on the example in which the backhoe 90 is applied to the work machine. However, each of the example embodiments produces the same example advantage even in a case where an apparatus other than the backhoe 90 is applied to the work machine. For example, another construction machine may be applied to the work machine. Specific examples of the other construction machine include a crane, a forklift, a roller, and a bulldozer. However, the specific example of the construction machine is not limited thereto. Alternatively, an automatic guided vehicle (AGV) may be applied to the work machine.

In the second to fourth example embodiments, the operator U does not necessarily need to be a human. For example, examples of the operator U include, but are not limited to, a computer and a robot which have an artificial intelligence (AI) function for operating the work machine. In the second to fourth example embodiments, the object being worked is not limited to the dirt and sand OBJ. For example, the object being worked may be, for example, dirt, sand, dirt and sand, snow, grain, cement, or may be a granular or amorphous solid, or a liquid. For example, in a case where the work machine is a crane, a payload lifted by the crane is applied to the object being worked.

[Variation 5]

The descriptions of the second to fourth example embodiments above focus on the example in which the dump truck 80 is applied to another work machine. However, another backhoe, another roller, another crane, or the like may be applied to the other work machine.

[Variation 6]

The above-described second to fourth example embodiments may include the video transmission apparatuses 10D, 10E, and 10F associated with a plurality of respective backhoes 90 and the remote control apparatuses 20D, 20E, and 20F associated with a plurality of respective backhoes 90. In this case, each of the remote control apparatuses 20D, 20E, and 20F transmits a remote control signal to the corresponding backhoe 90 associated therewith. Further, each of the video transmission apparatuses 10D, 10E, and 10F transmits a video regarding the corresponding backhoe 90 associated therewith, to the corresponding one of the remote control apparatuses 20D, 20E, and 20F. In this case, some of the video transmission apparatuses 10D, 10E, and 10F that are associated with the corresponding ones of the plurality of backhoes 90 may transmit the post-adjustment video. The other ones of the video transmission apparatuses 10D, 10E, and 10F may transmit the video as it is, without generating the post-adjustment video. For example, a server (not illustrated) may determine which of the plurality of backhoes 90 to transmit the post-adjustment video. Such a determination may be carried out on the basis of the degree of importance of the status of work performed by each backhoe 90. With such variations, in a case where a plurality of backhoes 90 perform work in the same work area, it is possible to preferentially transmit the videos regarding some of the plurality of backhoes 90 which have higher degrees of importance than the other backhoes 90, with stability, while maintaining operability.

[Variation 7]

According to the fourth example embodiment, the status identifying section 24F may identify the status of work further with reference to the result of analyzing the video, where necessary. In this respect, the operation of referring to an operation information history is considered to be carried out at a lighter load than is the process of analyzing a video. For example, in a case of failing to identify the status of work with reference to an operation information history, the status identifying section 24F may refer to the result of analyzing a video, to identify the status of work. The process of identifying the status of work with reference to the result of analyzing the video is as described in the second and third example embodiments. With such a variation, it is possible to improve the confidence of the status of work identified, while reducing the load at which the process of identifying the status of work is carried out.

[Variation 8]

According to the second to fourth example embodiments, each of the functional blocks may be disposed in the video transmission apparatuses 10D, 10E, and 10F, or may be disposed in the remote control apparatuses 20D, 20E, and 20F.

For example, according to the second example embodiment, the status identifying section 12D, the region identifying section 13D, or both may be disposed in the video transmission apparatus 10D, or may be disposed in the remote control apparatus 20D. The region identifying section 13D is however desirably capable of referring to the result of identification carried out by the status identifying section 12D without use of the network NW1. Thus, the status identifying section 12D and the region identifying section 13D are desirably both disposed in the video transmission apparatus 10D, or both disposed in the remote control apparatus 20D.

As another example, according to the third example embodiment, some or all of the components, namely the status identifying section 24E, the region identifying section 25E, the object recognizing section 26E, and the vector judging section 27E, may be disposed in the video transmission apparatus 10E, or may be disposed in the remote control apparatus 20E. The status identifying section 24E is however desirably capable of referring to the result of recognition carried out by the object recognizing section 26E, without use of the network NW1. Further, the region identifying section 25E is desirably capable of referring to the result of identification carried out by the status identifying section 24E and the result of judgment carried out by the vector judging section 27E, without use of the network NW1. Thus, these functional blocks 24E, 25E, 26E, and 27E are desirably all disposed in the video transmission apparatus 10E, or all disposed in the remote control apparatus 20E.

As another example, according to the fourth example embodiment, some or all of the components, namely the status identifying section 24F, the region identifying section 25F, and the predicting section 28F, may be disposed in the video transmission apparatus 10F, or may be disposed in the remote control apparatus 20F. The region identifying section 25F is however desirably capable of referring to the result of identification carried out by the status identifying section 24F and the result of prediction carried out by the predicting section 28F, without use of the network NW1. Thus, these functional blocks 24F, 25F, and 28F are desirably all disposed in the video transmission apparatus 10F, or all disposed in the remote control apparatus 20F. Further, the status identifying section 24F is desirably capable of referring to the operation information history accepted by the accepting section 23F, without use of the network NW1. In this case, these functional blocks 24F, 25F, and 28F are desirably all disposed in the remote control apparatus 20F.

[Variation 9]

In the video transmission methods S1, S1D, S1E, and S1F carried out in the example embodiments, the order in which the steps of each of the methods are carried out is not limited to the order described above. Further, a plurality of steps included in the methods may be carried out in parallel. The example embodiments may be carried out in combination. The functional blocks of each of the example embodiments are not limited to being integrated into one apparatus, but may be distributed among a plurality of apparatuses. Further, the functional blocks of each of the example embodiments may be disposed in the cloud. These functional blocks may be disposed in any apparatus(es) or cloud, provided that the above-described function of each of the functional blocks can be implemented by as-needed transmission and reception of information between these functional blocks.

Software Implementation Example

Some or all of the functions of each of the video transmission apparatuses 10, 10A, 10B, 10C, 10D, 10E, and 10F may be implemented by hardware such as an integrated circuit (IC chip), or may be implemented by software.

Figure 20:
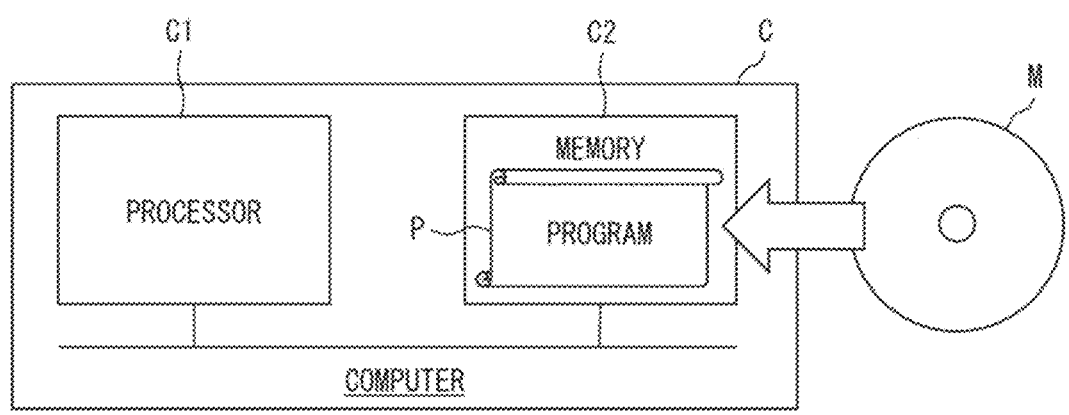
FIG. 20 is a block diagram illustrating an example of a physical configuration of apparatuses included in the video transmission systems in accordance with the example embodiments of the present invention.

In the latter case, the video transmission apparatuses 10, 10A, 10B, 10C, 10D, 10E, and 10F are each implemented by, for example, a computer that executes instructions of a program that is software implementing the foregoing functions. An example (hereinafter, computer C) of such a computer is illustrated in FIG. 20. The computer C includes at least one processor C1 and at least one memory C2. The memory C2 has recorded thereon a program P for causing the computer C to operate as the video transmission apparatuses 10, 10A, 10B, 10C, 10D, 10E, and 10F. The processor C1 of the computer C retrieves and executes the program P from the memory C2, so that the functions of the video transmission apparatuses 10, 10A, 10B, 10C, 10D, 10E, and 10F are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the above example embodiments.

[Additional Remark 2]

The whole or part of the example embodiments disclosed above can be described as, but not limited to, the following supplementary notes.

(Supplementary Note 1)

A video transmission system including:

an acquiring means for acquiring a video captured with at least a portion of a work machine and at least a portion of a work area of the work machine being within an angle of view;

a status identifying means for identifying a status of work performed, by the work machine, on an object being worked;

a region identifying means for identifying a target region in the video according to a result of identification carried out by the status identifying means; and a transmitting means for transmitting a post-adjustment video obtained by adjusting a relative image quality between the target region and a region outside the target region in the video.

With this configuration, it is possible to stably transmit a video of a surrounding area of the work machine even under an environment of a variable communication quality while maintaining operability during remote operation of the work machine.

(Supplementary Note 2)

The video transmission system described in supplementary note 1, in which the status of work identified by the status identifying means includes a status of a working portion of the work machine.

With this configuration, it is possible to more accurately determine the target region according to the status of the working portion.

(Supplementary Note 3)

The video transmission system described in supplementary note 2, in which the status of the working portion includes at least one selected from the group consisting of a position of the working portion, a motion of the working portion, and presence or absence of the object being worked in the working portion.

With this configuration, it is possible to further accurately determine the target region according to at least one selected from the group consisting of the position of the working portion, the motion of the working portion, and the presence or absence of the object being worked in the working portion.

(Supplementary Note 4)

The video transmission system described in any one of supplementary notes 1 to 3, in which the status identifying means is configured to identify the status of work with reference to at least a result of analyzing the video.

With this configuration, it is possible to more accurately determine the status of work on the basis of the information obtained from the video.

(Supplementary Note 5)

The video transmission system described in any one of supplementary notes 1 to 4, in which the status identifying means is configured to identify the status of work with reference to at least information which indicates a phase of work performed by the work machine.

With this configuration, it is possible to more accurately determine the status of work on the basis of the information which indicates the phase of work.

(Supplementary Note 6)

The video transmission system described in any one of supplementary notes 1 to 5, further including a predicting means for predicting a motion of the work machine, the region identifying means being configured to identify the target region further with reference to a result of prediction carried out by the predicting means.

With this configuration, it is possible to identify a target region such that the target region matches a region which will be of interest to an operator according to the predicted motion of the work machine.

(Supplementary Note 7)

The video transmission system described in any one of supplementary notes 1 to 6, in which the status of work identified by the status identifying means includes a status of another work machine located in a surrounding area of the work machine.

With this configuration, it is possible to further accurately determine the target region according to the status of the other work machine.

(Supplementary Note 8)

The video transmission system described in any one of supplementary notes 1 to 7, in which the acquiring means is configured to further acquire communication situation information which indicates a situation of communication conducted over a transmission path used by the transmitting means, and the transmitting means is configured to identify the relative image quality between the target region and the region outside the target region with reference to the communication situation information.

With this configuration, it is possible to flexibly switch, at the receiver, between displaying the at least the target region with an adjusted image quality and displaying the whole video with an unadjusted image quality, according to the communication situation.

(Supplementary Note 9)

A video transmission apparatus including:

an acquiring means for acquiring a video captured with at least a portion of a work machine and at least a portion of a work area of the work machine being within an angle of view;

a status identifying means for identifying a status of work performed, by the work machine, on an object being worked;

a region identifying means for identifying a target region in the video according to a result of identification carried out by the status identifying means; and a transmitting means for transmitting a post-adjustment video obtained by adjusting a relative image quality between the target region and a region outside the target region in the video.

This configuration produces the same example advantage that is produced by the supplementary note 1.

(Supplementary Note 10)

The video transmission apparatus described in supplementary note 9, in which the status of work identified by the status identifying means includes a status of a working portion of the work machine.

This configuration produces the same example advantage that is produced by the supplementary note 2.

(Supplementary Note 11)

The video transmission apparatus described in supplementary note 10, in which the status of the working portion includes at least one selected from the group consisting of a position of the working portion, a motion of the working portion, and presence or absence of the object being worked in the working portion.

This configuration produces the same example advantage that is produced by the supplementary note 3.

(Supplementary Note 12)

The video transmission apparatus described in any one of supplementary notes 9 to 11, in which the status identifying means is configured to identify the status of work with reference to at least a result of analyzing the video.

This configuration produces the same example advantage that is produced by the supplementary note 4.

(Supplementary Note 13)

The video transmission apparatus described in any one of supplementary notes 9 to 12, in which the status identifying means is configured to identify the status of work with reference to at least information which indicates a phase of work performed by the work machine.

This configuration produces the same example advantage that is produced by the supplementary note 5.

(Supplementary Note 14)

The video transmission apparatus described in any one of supplementary notes 9 to 13, further including a predicting means for predicting a motion of the work machine, the region identifying means being configured to identify the target region further with reference to a result of prediction carried out by the predicting means.

This configuration produces the same example advantage that is produced by the supplementary note 6.

(Supplementary Note 15)

The video transmission apparatus described in any one of supplementary notes 9 to 14, in which the status of work identified by the status identifying means includes a status of another work machine located in a surrounding area of the work machine.

This configuration produces the same example advantage that is produced by the supplementary note 7.

(Supplementary Note 16)

The video transmission apparatus described in any one of supplementary notes 9 to 15, in which the acquiring means is configured to further acquire communication situation information which indicates a situation of communication conducted over a transmission path used by the transmitting means, and the transmitting means is configured to identify the relative image quality between the target region and the region outside the target region with reference to the communication situation information.

This configuration produces the same example advantage that is produced by the supplementary note 8.

(Supplementary Note 17)

A video transmission method including:

acquiring a video captured with at least a portion of a work machine and at least a portion of a work area of the work machine being within an angle of view;

identifying a status of work performed, by the work machine, on an object being worked;

identifying a target region in the video according to a result of identification of the status of work; and transmitting a post-adjustment video obtained by adjusting a relative image quality between the target region and a region outside the target region in the video.

This configuration produces the same example advantage that is produced by the supplementary note 1.

(Supplementary Note 18)

The video transmission method described in supplementary note 17, in which the status of work identified includes a status of a working portion of the work machine.

This configuration produces the same example advantage that is produced by the supplementary note 2.

(Supplementary Note 19)

The video transmission method described in supplementary note 18, in which the status of the working portion includes at least one selected from the group consisting of a position of the working portion, a motion of the working portion, and presence or absence of the object being worked in the working portion.

This configuration produces the same example advantage that is produced by the supplementary note 3.

(Supplementary Note 20)

The video transmission method described in any one of supplementary notes 17 to 19, in which in identifying the status of work, at least a result of analyzing the video is referred to.

This configuration produces the same example advantage that is produced by the supplementary note 4.

(Supplementary Note 21)

The video transmission method described in any one of supplementary notes 17 to 20, in which in identifying the status of work, at least information which indicates a phase of work performed by the work machine is referred to.

This configuration produces the same example advantage that is produced by the supplementary note 5.

(Supplementary Note 22)

The video transmission method described in any one of supplementary notes 17 to 21, in which a motion of the work machine is predicted, and in identifying the target region, a result of prediction of the motion of the work machine is further referred to.

This configuration produces the same example advantage that is produced by the supplementary note 6.

(Supplementary Note 23)

The video transmission method described in any one of supplementary notes 17 to 22, in which the status of work identified includes a status of another work machine located in a surrounding area of the work machine.

This configuration produces the same example advantage that is produced by the supplementary note 7.

(Supplementary Note 24)

The video transmission method described in any one of supplementary notes 17 to 23, in which communication situation information is further acquired, the communication situation information indicating a situation of communication conducted over a transmission path via which the post-adjustment video is transmitted, and a relative image quality between the target region and a region outside the target region is identified with reference to the communication situation information.

This configuration produces the same example advantage that is produced by the supplementary note 8.

(Supplementary Note 25)

A program for causing a computer to function as a video transmission apparatus, the program causing the computer to function as an acquiring means for acquiring a video captured with at least a portion of a work machine and at least a portion of a work area of the work machine being within an angle of view;

a status identifying means for identifying a status of work performed, by the work machine, on an object being worked;

a region identifying means for identifying a target region in the video according to a result of identification carried out by the status identifying means; and a transmitting means for transmitting a post-adjustment video obtained by adjusting a relative image quality between the target region and a region outside the target region in the video.

This configuration produces the same example advantage that is produced by the supplementary note 1.

(Supplementary Note 26)

The program described in supplementary note 25, in which the status of work identified by the status identifying means includes a status of a working portion of the work machine.

This configuration produces the same example advantage that is produced by the supplementary note 2.

(Supplementary Note 27)

The video transmission system described in supplementary note 26, in which the status of the working portion includes at least one selected from the group consisting of a position of the working portion, a motion of the working portion, and presence or absence of the object being worked in the working portion.

This configuration produces the same example advantage that is produced by the supplementary note 3.

(Supplementary Note 28)

The program described in any one of supplementary notes 25 to 27, in which the status identifying means is configured to identify the status of work with reference to at least a result of analyzing the video.

This configuration produces the same example advantage that is produced by the supplementary note 4.

(Supplementary Note 29)

The program described in any one of supplementary notes 25 to 28, in which the status identifying means is configured to identify the status of work with reference to at least information which indicates a phase of work performed by the work machine.

This configuration produces the same example advantage that is produced by the supplementary note 5.

(Supplementary Note 30)

The program described in any one of supplementary notes 25 to 29, further including a predicting means for predicting a motion of the work machine, the region identifying means being configured to identify the target region further with reference to a result of prediction carried out by the predicting means.

This configuration produces the same example advantage that is produced by the supplementary note 6.

(Supplementary Note 31)

The program described in any one of supplementary notes 25 to 30, in which the status of work identified by the status identifying means includes a status of another work machine located in a surrounding area of the work machine.

This configuration produces the same example advantage that is produced by the supplementary note 7.

(Supplementary Note 32)

The program described in any one of supplementary notes 25 to 31, in which the acquiring means is configured to further acquire communication situation information which indicates a situation of communication conducted over a transmission path used by the transmitting means, and the transmitting means is configured to identify the relative image quality between the target region and the region outside the target region with reference to the communication situation information.

This configuration produces the same example advantage that is produced by the supplementary note 8.

[Additional Remark 3]

The whole or part of the example embodiments disclosed above can be further described as the following supplementary notes.

A video transmission apparatus including at least one processor, the at least one processor carrying out:

an acquiring process of acquiring a video captured with at least a portion of a work machine and at least a portion of a work area of the work machine being within an angle of view;

a status identifying process of identifying a status of work performed, by the work machine, on an object being worked;

a region identifying process of identifying a target region in the video according to a result of identification carried out by the status identifying process; and a transmitting process of transmitting a post-adjustment video obtained by adjusting a relative image quality between the target region and a region outside the target region in the video.

It should be noted that this video transmission apparatus may further include a memory, and this memory may have stored therein a program for causing the at least one processor to perform the acquiring process, the status identifying process, the region identifying process, the transmitting process. In addition, this program may be recorded on a computer-readable, non-transitory, and tangible recording medium.

REFERENCE SIGNS LIST 1, 1A, 1B, 1C, 1D, 1E, 1F: Video transmission system
2F, 10D, 12, 12D, 24E, 24F: Status identifying section
10, 10A, 10B, 10C, 10D, 10E, 10F: Video transmission apparatus
60C: Control apparatus
11, 11D, 11E, 11F: Acquiring section
12, 12D, 24E, 24F: Status identifying section
13, 13D, 25E, 25F: Region identifying section
14, 14D, 14E, 14F: Transmitting section
15D, 15E, 15F: Adjusting section
26E: Object recognizing section
27E: Vector judging section
28F: Predicting section
20, 20A, 20B, 20C, 20D, 20E, 20F: Remote control apparatus
21D, 21E, 21F: Decoding section
22D, 22E, 22F: Displaying section
23D, 23E, 23F: Accepting section

What is claimed is:

1. A video transmission system comprising at least one processor, the at least one processor carrying out:

an acquiring process of acquiring a video captured with at least a portion of a work machine and at least a portion of a work area of the work machine being within an angle of view;

a status identifying process of identifying a status of work performed, by the work machine, on an object being worked;

a region identifying process of identifying a target region in the video according to a result of identification carried out in the status identifying process; and a transmitting process of transmitting a post-adjustment video obtained by adjusting a relative image quality between the target region and a region outside the target region in the video.

2. The video transmission system according to claim 1, wherein
the status of work identified in the status identifying process includes
a status of a working portion of the work machine.

3. The video transmission system according to claim 1, wherein
in the status identifying process, the at least one processor identifies the status of work with reference to at least a result of analyzing the video.

4. The video transmission system according to claim 1, wherein
in the status identifying process, the at least one processor identifies the status of work with reference to at least information which indicates a phase of work performed by the work machine.

5. The video transmission system according to claim 1, wherein
the at least one processor further carries out
a predicting process of predicting a motion of the work machine, and
in the region identifying process, the at least one processor identifies the target region further with reference to a result of prediction carried out in the predicting process.

6. The video transmission system according to claim 1, wherein
the status of work identified in the status identifying process includes
a status of another work machine located in a surrounding area of the work machine.

7. The video transmission system according to claim 1, wherein
in the acquiring process, the at least one processor further acquires communication situation information which indicates a situation of communication conducted over a transmission path used in the transmitting process, and
in the transmitting process, the at least one processor identifies the relative image quality between the target region and the region outside the target region with reference to the communication situation information.

8. A video transmission apparatus comprising
at least one processor, the at least one processor carrying out:
an acquiring process of acquiring a video captured with at least a portion of a work machine and at least a portion of a work area of the work machine being within an angle of view;
a status identifying process of identifying a status of work performed, by the work machine, on an object being worked;
a region identifying process of identifying a target region in the video according to a result of identification carried out in the status identifying process; and
a transmitting process of transmitting a post-adjustment video obtained by adjusting a relative image quality between the target region and a region outside the target region in the video.

9. The video transmission apparatus according to claim 8, wherein
the status of work identified in the status identifying process includes
a status of a working portion of the work machine.

10. The video transmission apparatus according to claim 8, wherein
in the status identifying process, the at least one processor identifies the status of work with reference to at least a result of analyzing the video.

11. The video transmission apparatus according to claim 8, wherein
in the status identifying process, the at least one processor identifies the status of work with reference to at least information which indicates a phase of work performed by the work machine.

12. The video transmission apparatus according to claim 8, wherein
the at least one processor further carries out
a predicting process of predicting a motion of the work machine, and
in the region identifying process, the at least one processor identifies the target region further with reference to a result of prediction carried out in the predicting process.

13. The video transmission apparatus according to claim 8, wherein
the status of work identified in the status identifying process includes
a status of another work machine located in a surrounding area of the work machine.

14. The video transmission apparatus according to claim 8, wherein
in the acquiring process, the at least one processor further acquires communication situation information which indicates a situation of communication conducted over a transmission path used in the transmitting process, and
in the transmitting process, the at least one processor identifies the relative image quality between the target region and the region outside the target region with reference to the communication situation information.

15. A video transmission method comprising:
at least one processor acquiring a video captured with at least a portion of a work machine and at least a portion of a work area of the work machine being within an angle of view;
the at least one processor identifying a status of work performed, by the work machine, on an object being worked;
the at least one processor identifying a target region in the video according to a result of identification of the status of work; and
the at least one processor transmitting a post-adjustment video obtained by adjusting a relative image quality between the target region and a region outside the target region in the video.

16. The video transmission method according to claim 15, wherein
the status of work identified includes
a status of a working portion of the work machine.

17. The video transmission method according to claim 15, wherein
in identifying the status of work, the at least one processor refers to
at least a result of analyzing the video.

18. The video transmission method according to claim 15, wherein
in identifying the status of work, the at least one processor refers to
at least information which indicates a phase of work performed by the work machine.

19. The video transmission method according to claim 15, wherein
- the at least one processor predicts a motion of the work machine, and
- in identifying the target region,
  - the at least one processor further refers to a result of prediction of the motion of the work machine.

20. A non-transitory recording medium having recorded thereon a program for causing a computer to function as the video transmission apparatus according to claim 8,
- the program causing the computer to carry out the acquiring process, the status identifying process, the region identifying process, and the transmitting process.

\* \* \* \* \*